US010723365B2

(12) United States Patent
Kume et al.

(10) Patent No.: US 10,723,365 B2
(45) Date of Patent: Jul. 28, 2020

(54) DRIVING ASSISTANCE DEVICE

(71) Applicant: DENSO CORPORATION, Kariya, Aichi-pref. (JP)

(72) Inventors: Takuya Kume, Kariya (JP); Akihiro Hayashi, Kariya (JP); Takahiro Ishikawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/514,190

(22) Filed: Jul. 17, 2019

(65) Prior Publication Data
US 2019/0337533 A1 Nov. 7, 2019

Related U.S. Application Data

(63) Continuation of application No. PCT/JP2018/001889, filed on Jan. 23, 2018.

(30) Foreign Application Priority Data

Mar. 24, 2017 (JP) ................................. 2017-059729

(51) Int. Cl.
*B60Q 1/00* (2006.01)
*B60W 50/14* (2020.01)
*B60W 30/095* (2012.01)

(52) U.S. Cl.
CPC ........ *B60W 50/14* (2013.01); *B60W 30/0956* (2013.01); *B60W 2050/143* (2013.01); *B60W 2554/801* (2020.02); *B60W 2554/804* (2020.02)

(58) Field of Classification Search
CPC ............ B60W 50/14; B60W 30/0956; B60W 2554/801; B60W 2554/804;
(Continued)

(56) References Cited

U.S. PATENT DOCUMENTS 8,666,563 B2 * 3/2014 Tokumochi ........... B60W 50/10
180/272
9,707,973 B2 * 7/2017 Kobana ................. B60W 30/12
(Continued)

FOREIGN PATENT DOCUMENTS

JP   H10096777 A   4/1998
JP   H10116400 A   5/1998
(Continued)

*Primary Examiner* — Anh V La
(74) *Attorney, Agent, or Firm* — Harness, Dickey & Pierce, P.L.C.

(57) ABSTRACT

A driving assistance device that performs a notification process for notifying a driver of a risk of a collision with a preceding vehicle in cooperation with a notification device includes: an inter-vehicular distance acquisition section that successively acquires an inter-vehicular distance; a first index calculator that calculates a first risk index indicating a degree of the risk of the collision based on a traveling speed and the inter-vehicular distance; a second index calculator that successively calculates a second risk index based on a relative speed between the own vehicle and the preceding vehicle; a notification level determination section that successively determines a notification level indicating a strength of notification for notifying the risk of the collision, based on the first risk index and the second risk index; and a notification processor that performs the notification process in a notification mode corresponding to the notification level.

8 Claims, 12 Drawing Sheets

(58) Field of Classification Search
CPC ..... B60W 2050/143; B60W 2050/146; B60W 2554/00; B60W 2556/50; B60W 2530/14; B60K 2370/179; B60K 2370/186; B60K 2370/178; B60K 35/00; B60K 2370/16; G01C 21/34; G08G 1/167
USPC ................ 340/435, 436, 438, 905, 937, 936
See application file for complete search history.

(56) References Cited

U.S. PATENT DOCUMENTS

| | | | |
|---|---|---|---|
| 9,965,956 B2* | 5/2018 | Tsushima | ................ G08G 1/16 |
| 2001/0003436 A1 | 6/2001 | Yoshikawa | |
| 2010/0052884 A1 | 3/2010 | Zeppelin et al. | |
| 2016/0082978 A1* | 3/2016 | Ozaki | ................... B60W 50/14 |
| | | | 701/58 |

FOREIGN PATENT DOCUMENTS

| | | | |
|---|---|---|---|
| JP | 2001167397 A | 6/2001 | |
| JP | 2004164187 A | 6/2004 | |
| JP | 2010128669 A | 6/2010 | |
| JP | 4728427 B2 | 7/2011 | |
| JP | 2015162005 A | 9/2015 | |

* cited by examiner

FIG. 8

|  | 1ST RISK LEVEL | | | |
|---|---|---|---|---|
|  | 1 | 2 | 3 | 4 |
| 2ND RISK LEVEL  1 | 0 | 0 | 1 | 1 |
| 2ND RISK LEVEL  2 | 0 | 1 | 1 | 2 |
| 2ND RISK LEVEL  3 | 0 | 2 | 2 | 3 |

FIG. 9

|  | NOTIFICATION LEVEL | | |
|---|---|---|---|
|  | 1 | 2 | 3 |
| DISPLAY | DISPLAY OF ALERT IMAGE | DISPLAY OF ALERT IMAGE | DISPLAY OF WARNING IMAGE |
| SPEAKER | (NOT IN OPERATION) | WARNING SOUND OUTPUT (LOW SOUND) | WARNING SOUND OUTPUT (HIGH SOUND) |
| PERIPHERAL VISION DEVICE | LIGHT UP | BLINK (RATHER LONG INTERVAL) | BLINK (RATHER SHORT INTERVAL) |
| TACTILE DEVICE | (NOT IN OPERATION) | WEAK VIBRATIONS | STRONG VIBRATIONS |

NOTIFICATION LEVEL IS LOW

NOTIFICATION LEVEL IS HIGH

NOTIFICATION LEVEL IS LOW

NOTIFICATION LEVEL IS HIGH

FIG. 18

|    | DEFAULT THRESHOLD | ABNORMAL STATE THRESHOLD |
|----|-------------------|--------------------------|
| D3 | 2.0               | 1.8                      |
| D2 | 1.5               | 1.3                      |
| D1 | 1.0               | 0.8                      |

|  |  | 1ST RISK LEVEL | | | |
|---|---|---|---|---|---|
|  |  | 1 | 2 | 3 | 4 |
| 2ND RISK LEVEL | 1 | 0 | 1 (+1) | 1 | 2 (+1) |
|  | 2 | 0 | 1 | 2 (+1) | 3 (+1) |
|  | 3 | 0 | 2 | 3 (+1) | 3 |

DRIVING ASSISTANCE DEVICE

CROSS REFERENCE TO RELATED APPLICATIONS

The present application is a continuation application of International Patent Application No. PCT/JP2018/001889 filed on Jan. 23, 2018, which designated the United States and claims the benefit of priority from Japanese Patent Application No. 2017-059729 filed on Mar. 24, 2017. The entire disclosures of all of the above applications are incorporated herein by reference.

TECHNICAL FIELD

The present disclosure relates to a driving assistance device that warns a driver of the possibility of a collision with a preceding vehicle.

BACKGROUND

There has conventionally been a driving assistance device that warns a driver of the possibility of a collision with a preceding vehicle by outputting a warning sound according to the following distance from the preceding vehicle. For example, a driving assistance device calculates a safe following distance according to the vehicle speed of the own vehicle, successively calculates the degree of risk which is a value obtained by dividing the calculated safe following distance by an actual following distance from the preceding vehicle, and outputs a warning sound in a mode corresponding to the degree of risk. Specifically, a warning sound in a first stage is output when the degree of risk is 1 or more and less than 1.5, and a warning sound in a second stage is output when the degree of risk is 1.5 or more and less than 2.0. Further, a warning sound in a third stage is output when the degree of risk is 2.0 or more.

SUMMARY

A driving assistance device that performs a notification process for notifying a driver of a risk of a collision with a preceding vehicle in cooperation with a notification device includes: an inter-vehicular distance acquisition section that successively acquires an inter-vehicular distance; a first index calculator that calculates a first risk index indicating a degree of the risk of the collision based on a traveling speed and the inter-vehicular distance; a second index calculator that successively calculates a second risk index based on a relative speed between the own vehicle and the preceding vehicle; a notification level determination section that successively determines a notification level indicating a strength of notification for notifying the risk of the collision, based on the first risk index and the second risk index; and a notification processor that performs the notification process in a notification mode corresponding to the notification level.

BRIEF DESCRIPTION OF THE DRAWINGS

The above and other objects, features and advantages of the present disclosure will become more apparent from the following detailed description made with reference to the accompanying drawings. In the drawings:

FIG. 8 is a diagram illustrating an example of the correspondence relationship between a first risk level, a second risk level, and a notification level;

FIG. 9 is a diagram illustrating an example of a notification mode corresponding to the notification level;

FIG. 18 is a diagram illustrating an example of a default threshold and an abnormal state threshold;

DETAILED DESCRIPTION

Figure 1:
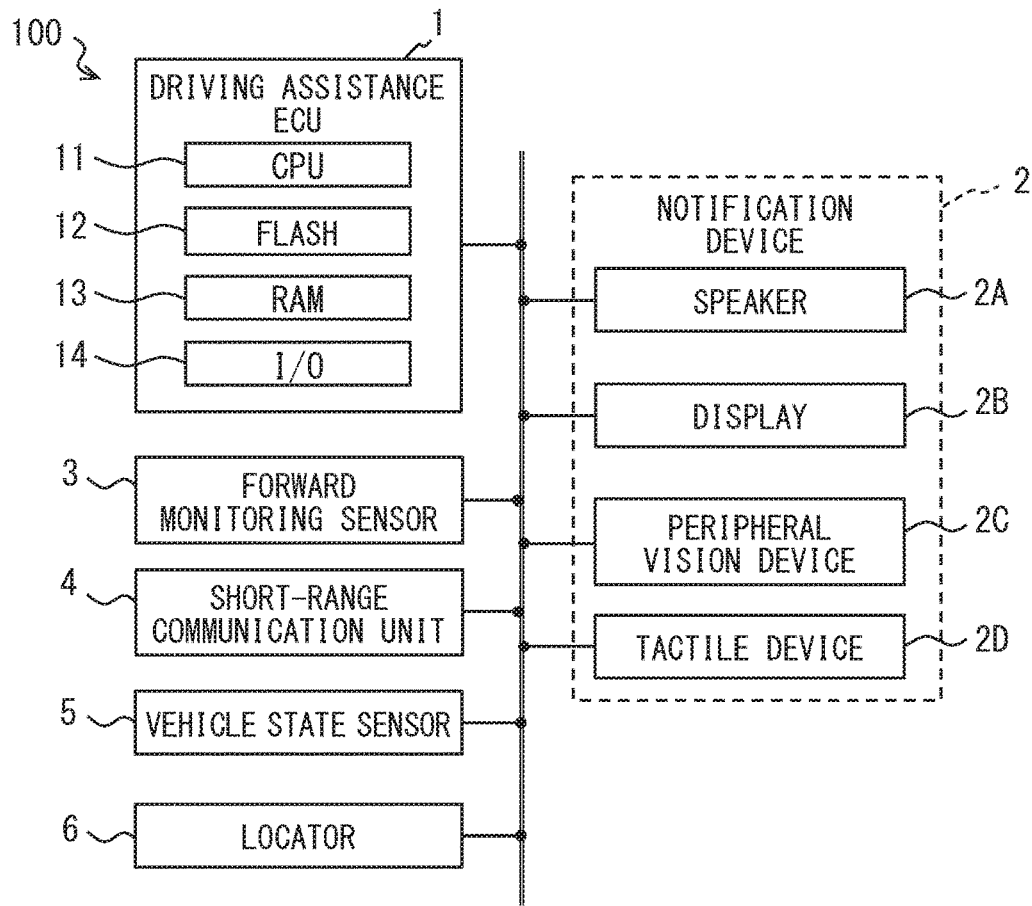
FIG. 1 is a block diagram illustrating a schematic configuration of a driving assistance system.

In a conventional configuration of a driving assistance device, the warning sound is continuously output in the same mode until the degree of risk exceeds or falls below a predetermined threshold which defines an output mode of the warning sound (hereinbelow, the warning threshold). Thus, even when the preceding vehicle is suddenly braked, the warning sound in a relatively weak mode is continuously output until the following distance is sufficiently reduced to such an extent that the degree of risk exceeds the warning threshold. In this manner, a certain time is required from sudden braking of the preceding vehicle to a change in the output mode of the warning sound. Thus, there is a possibility that the driver does not immediately notice the sudden braking of the preceding vehicle.

A driving assistance device according to an example embodiment of the present disclosure is provided to be capable of notifying a driver of the risk of a collision with a preceding vehicle in a more appropriate notification mode.

According to an aspect of an example embodiment, a driving assistance device that performs a notification process for notifying a driver of a risk of a collision with a preceding vehicle in cooperation with a predetermined notification device, the driving assistance device includes: an inter-vehicular distance acquisition section that successively acquires an inter-vehicular distance between the preceding vehicle and an own vehicle; a first index calculator that calculates a first risk index that is a parameter indicating a degree of the risk of the collision between the preceding vehicle and the own vehicle based on a traveling speed of the own vehicle and the inter-vehicular distance acquired by the inter-vehicular distance acquisition section; a second index calculator that successively calculates a second risk index that is a parameter indicating the degree of the risk of the collision between the preceding vehicle and the own vehicle, the second risk index being different from the first risk index, based on a relative speed between the own vehicle and the preceding vehicle; a notification level determination section that successively determines a notification level indicating a strength of notification for notifying the driver of the risk of the collision with the preceding vehicle, based on the first risk index calculated by the first index calculator and the second risk index calculated by the second index calculator; and a notification processor that performs the notification process in a notification mode corresponding to the notification level determined by the notification level determination section.

The second risk index is a parameter that is determined according to the relative speed. Thus, when the preceding vehicle is suddenly braked, the second risk index also transitions to a value indicating that the degree of risk is relatively high in response to the sudden braking of the preceding vehicle. The notification level that determines the notification mode when the risk of a collision with the preceding vehicle is notified is determined also by the second risk index. Thus, when the second index transitions to a value indicating that the degree of risk is relatively high, the notification level may also rise. That is, when the driver performs a deceleration operation, the notification level may rise even in the condition where the inter-vehicular distance has not much changed yet. When the notification level rises, the notification mode, of course, changes to a relatively strong mode.

As described above, according to the above driving assistance device, the notification mode may change in response to sudden braking of the preceding vehicle even in the condition where the inter-vehicular distance has not much changed yet. Thus, it is possible to reduce the possibility that the driver does not immediately notice the sudden braking of the preceding vehicle. That is, according to the above configuration, it is possible to notify the driver of the risk in a more appropriate notification mode.

Hereinbelow, a driving assistance system 100 to which the present disclosure is applied will be described as an example of an embodiment for carrying out the present disclosure with reference to the drawings. As illustrated in FIG. 1, the driving assistance system 100 of the present embodiment is provided with a driving assistance ECU 1, a notification device 2, a forward monitoring sensor 3, a short-range communication unit 4, a vehicle state sensor 5, and a locator 6. In the present embodiment, the notification device 2 notifies an occupant seated on a driver's seat (hereinbelow, the driver) of predetermined information using sound, light, or vibrations. The driving assistance system 100 of the present embodiment is provided with, as the notification device 2, a speaker 2A, a display 2B, a peripheral vision device 2C, and a tactile device 2D. The ECU in the element's name stands for an electronic control unit.

Each of the notification devices 2 including the various devices, the forward monitoring sensor 3, the short-range communication unit 4, the vehicle state sensor 5, and the locator 6 is communicably connected to the driving assistance ECU 1 through a communication network constructed inside the vehicle (hereinbelow, the local area network (LAN)). Hereinbelow, the vehicle equipped with the driving assistance system 100 is also referred to as an own vehicle Hv.

The driving assistance ECU 1 successively determines the risk of a collision with a preceding vehicle Pv. When the driving assistance ECU 1 determines that the possibility of a collision with the preceding vehicle Pv is a predetermined level or higher, the driving assistance ECU 1 performs a process for notifying the driver of the risk of a collision with the preceding vehicle Pv (hereinbelow, the notification process) in cooperation with the notification device 2. The driving assistance ECU 1 corresponds to the driving assistance device.

The driving assistance ECU 1 is configured as a computer. That is, the driving assistance ECU 1 is provided with a CPU 11 which executes various arithmetic processes, a flash memory 12 which is a nonvolatile memory, a RAM 13 which is a volatile memory, an I/O 14, and a bus line which connects the CPU 11, the flash memory 12, the RAM 13, and the I/O 14. For example, the CPU 11 may be implemented using a microprocessor. The I/O 14 is an interface for input and output of data between the driving assistance ECU 1 and an external device (e.g., the forward monitoring sensor 3). The I/O 14 may be implemented using an IC, a digital circuit element, or an analog circuit element.

A program for causing an ordinary computer to function as the driving assistance ECU 1 (hereinbelow, the driving assistance program) is stored in the flash memory 12. The driving assistance program may be stored in a non-transitory tangible storage medium including the flash memory 12. Executing the driving assistance program by the CPU 11 corresponds to executing a method corresponding to the driving assistance program. The driving assistance ECU 1 provides various functions by executing the driving assistance program by the CPU 11. The various functions of the driving assistance ECU 1 will be separately described below.

The speaker 2A outputs a voice or a warning sound in accordance with a signal input from the driving assistance ECU 1. The speaker 2A may be a parametric speaker which achieves sharp directivity using ultrasonic waves.

The display 2B is a device that displays an image input from the driving assistance ECU 1. In the present embodiment, as an example, the display 2B is a display that is disposed on the uppermost part of the central part in the vehicle-width direction (hereinbelow, the central area) of an instrument panel (so-called center display). The display 2B is capable of performing full-color display and can be implemented using a liquid crystal display, an organic EL display, or a plasma display.

As another mode, the display 2B may be a head-up display which shows a virtual image on a part of a windshield in front of the driver's seat. The display 2B may be a display that is disposed in an area located at the front of the driver's seat in the instrument panel (so-called meter display). The display 2B may be a display that is mounted at a position other than the above positions or a display that is mounted on an information processing terminal carried into a cabin by the driver.

The peripheral vision device 2C is a light emitting device implemented using an LED. The peripheral vision device 2C is disposed at a position within a peripheral visual field of the driver who directs the eyes in the front direction of the own vehicle Hv. The peripheral visual field indicates an area that is out of an effective field of view and within the field of vision. The effective field of view may be, for example, a range within 30 degrees in the vertical direction and within 20 degrees in the horizontal direction relative to the direction in which the eyes are directed. A part within the peripheral visual field of the driver who directs the eyes in the front direction of the own vehicle Hv inside the cabin includes, for example, an upper face part 200 of the instrument panel (hereinbelow, the instrument panel upper face part 200) and a surface part 300 of a front pillar on the inner side of the cabin.

Figure 2:
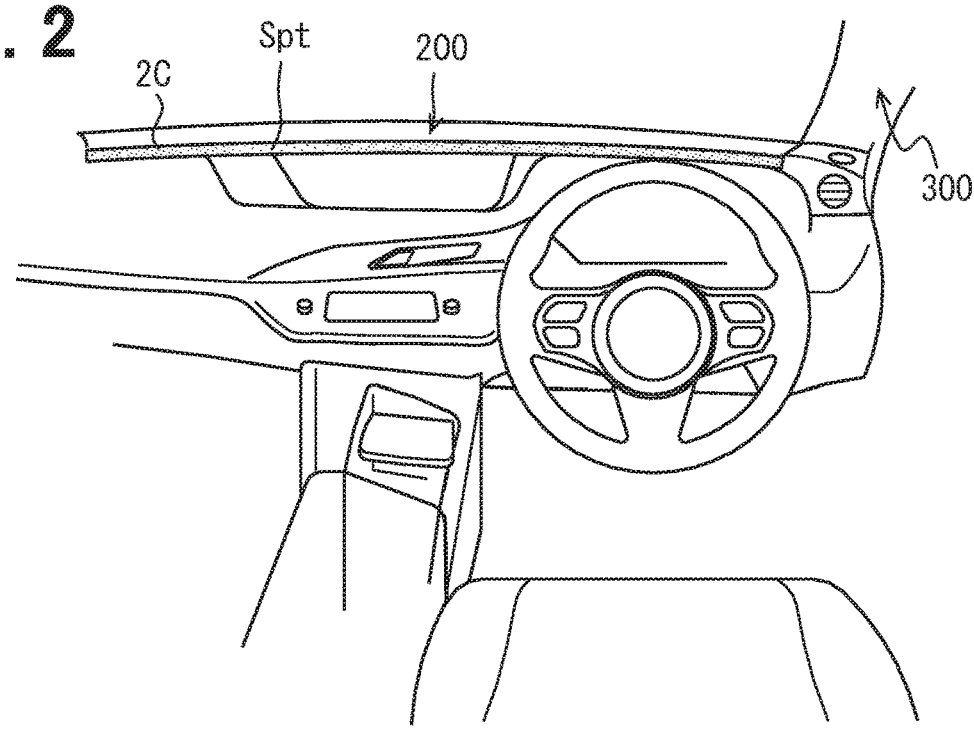
FIG. 2 is a diagram illustrating an example of an installation position of a peripheral vision device.

In the present embodiment, as an example, the peripheral vision device 2C is implemented by arranging a plurality of light emitting elements in the vehicle-width direction on the instrument panel upper face part 200 as illustrated in FIG. 2. The light emitting elements constituting the peripheral vision device 2C may be arranged along a connection part between the lower end of the windshield and the instrument panel upper face part 200 or may be arranged along the edge of the instrument panel upper face part 200 on the seat side.

The peripheral vision device 2C causes some or all of the light emitting elements to emit light in accordance with an instruction from the driving assistance ECU 1. The peripheral vision device 2C causes a light emitting element located at a position corresponding to an instruction from the driving assistance ECU 1 to emit light in a predetermined light emitting mode to form a partial conspicuous spot Spt. Elements constituting the light emitting mode include color, luminance, the presence or absence of blinking, and a blinking interval. The conspicuous spot Spt itself provided by the peripheral vision device 2C is implemented by locally causing some of the light emitting element to emit light. Thus, the position of the conspicuous spot Spt is movable in the width direction. In addition, the peripheral vision device 2C is capable of changing a light emitting color and a light emitting size of the conspicuous spot Spt.

The tactile device 2D stimulates the tactile sense of the driver by generating vibrations. For example, a vibrator which is disposed on a part in contact with the body of the driver such as a steering wheel, an accelerator pedal, a brake pedal, the driver's seat, or a seat belt can be employed as the tactile device 2D.

In the present embodiment, as an example, the tactile device 2D is a vibrator disposed on the accelerator pedal. The tactile device 2D generates vibrations in a designated vibration mode in accordance with an instruction from the driving assistance ECU 1. The vibration mode includes the strength of vibrations and a generation interval of vibrations.

The tactile device 2D may apply not vibrations, but, for example, a pressing force to the hand of the driver or produce an illusion of a tractive force using a mechanism that performs asymmetrical vibrations. The tactile sense in the present embodiment includes a warm sensation. That is, the tactile device 2D may stimulate the tactile sense of the driver using heat. A medium that transmits heat may be the steering wheel or air blown out of an air conditioner.

The forward monitoring sensor 3 is a device that collects information about another vehicle and a traveling environment ahead of the own vehicle Hv. For example, a forward monitoring camera that captures an image of a predetermined range ahead of the vehicle, a millimeter wave radar that transmits a probing wave to a predetermined range ahead of the vehicle, a light detection and ranging/laser imaging detection and ranging (LIDAR), or a sonar can be employed as the forward monitoring sensor 3.

In the present embodiment, the driving assistance system 100 is provided with, as the forward monitoring sensor 3, a forward monitoring camera which is mounted to capture an image of an area ahead of the vehicle and a millimeter wave radar whose detection area is an area ahead of the vehicle (hereinbelow, the forward radar). The forward monitoring camera as the forward monitoring sensor 3 successively outputs captured images to the driving assistance ECU 1.

The forward radar as the forward monitoring sensor 3 detects another vehicle traveling ahead of the own vehicle Hv (that is, the preceding vehicle Pv) by transmitting and receiving a probing wave. Further, when the preceding vehicle Pv is detected, the forward radar successively detects a following distance and a relative speed Vr between the preceding vehicle Pv and the own vehicle Hv. The preceding vehicle includes a motorized bicycle, a motorcycle, and a bicycle. Data indicating the following distance and the relative speed Vr between the preceding vehicle Pv and the own vehicle Hv is successively supplied as detection result data to the driving assistance ECU 1.

In the present embodiment, the relative speed Vr indicates the speed of the own vehicle Hv relative to the preceding vehicle Pv as an example. That is, when the traveling speed of the preceding vehicle Pv is Vp and the traveling speed of the own vehicle Hv is Vh, the relative speed Vr=Vp−Vh. Thus, when the traveling speed Vh of the own vehicle Hv is higher than the traveling speed Vp of the preceding vehicle Pv, and the own vehicle Hv is thus approaching the preceding vehicle Pv, the relative speed Vr has a positive value. When the traveling speed Vh of the own vehicle Hv is lower than the traveling speed Vp of the preceding vehicle Pv, and the own vehicle Hv is thus moving away from the preceding vehicle Pv, the relative speed Vr has a negative value. Of course, as another mode, the relative speed Vr may indicate the speed of the preceding vehicle Pv relative to the own vehicle Hv.

The short-range communication unit 4 is a communication module for performing direct wireless communication (in other words, without through a wide area network) with another vehicle present around the vehicle Hv using a radio wave in a predetermined frequency band. That is, the short-range communication unit 4 is a communication module for performing vehicle-to-vehicle communication. The frequency band used in the vehicle-to-vehicle communication is, for example, the 760 MHz band. In addition, the 2.4 GHz band and the 5.9 GHz band can also be used. Any communication standard can be employed as a communication standard for implementing the vehicle-to-vehicle communication. For example, the wireless access in vehicular environment (WAVE) standard disclosed in IEEE 1609 can be employed.

When the short-range communication unit 4 receives a vehicle information packet transmitted from another vehicle, the short-range communication unit 4 supplies data indicated by the vehicle information packet to the driving assistance ECU 1. In the present embodiment, the vehicle information packet is a communication packet indicating vehicle information of a vehicle that transmits the vehicle information packet (that is, the source vehicle). The vehicle information includes a current position, a traveling direction, a traveling speed, and an acceleration of the source vehicle. The vehicle information packet includes, in addition to the vehicle information, information such as a transmission time of the communication packet and source information. The source information is an identification number assigned to a vehicle as the source (co-called vehicle ID). That is, the short-range communication unit 4 successively supplies vehicle information of another vehicle indicated by the vehicle information packet transmitted from another vehicle at any time (hereinbelow, the another-vehicle information) to the driving assistance ECU 1.

In the present embodiment, the driving assistance ECU 1 is configured to acquire vehicle information of another vehicle by communication without through a wide area network. However, the present disclosure is not limited thereto. As another mode, the driving assistance ECU 1 may be configured to acquire vehicle information of another vehicle through a wide area network.

The vehicles state sensor 5 detects a state quantity relating to traveling control of the own vehicle Hv. Examples of the vehicle state sensor 5 include a vehicle speed sensor, an acceleration sensor, a shift position sensor, a steering angle sensor, an accelerator sensor, and a brake sensor. The vehicle speed sensor detects the traveling speed Vh of the own vehicle Hv. The acceleration sensor detects an acceleration acting in the vehicle front-rear direction and an acceleration acting in the vehicle-width direction. The shift position sensor detects the position of a shift lever. The steering angle sensor detects a rotation angle of the steering wheel (so-called steering angle) and functions as a sensor that detects a steering amount by the driver. The brake sensor detects the position of the brake pedal, in other words, the amount by which the brake pedal is depressed by the driver (hereinbelow, the brake depressing amount). The acceleration sensor detects the position of the accelerator pedal, in other words, the amount by which the accelerator pedal is depressed by the driver (hereinbelow, the accelerator depressing amount).

Each of the sensors successively supplies data indicating the current value of a physical state quantity to be detected (that is, a detection result) to the driving assistance ECU 1. The types of sensors that should be included in the driving assistance system 100 as the vehicle state sensor 5 may be appropriately designed. The driving assistance system 100 does not necessarily include all of the sensors described above.

The locator 6 is a device that measures the current position of the vehicle. For example, the locator 6 is implemented using a GNSS receiver, an inertial sensor, and a map database (hereinbelow, the DB). The GNSS receiver is a device that successively (e.g., every 100 milliseconds) detects the current position of the GNSS receiver by receiving navigation signals transmitted from a positioning satellite which constitutes a global navigation satellite system (GNSS). The inertial sensor is, for example, a three-axel gyro sensor and a three-axel acceleration sensor. The map DB is a nonvolatile memory that stores map data indicating the connection relationship between roads therein.

The locator 6 successively identifies the current position of the own vehicle Hv by combining a measurement result of the GNSS receiver, a measurement result in the inertial sensor, and the map data. The locator 6 successively supplies vehicle position data indicating the identified current position to the driving assistance ECU 1. The current position of the own vehicle Hv may be represented by, for example, latitude, longitude, and altitude. The locator 6 reads map data in a predetermined range determined based on the current position from the map DB and supplies the read map data to the driving assistance ECU 1. The map data may be acquired from an external server through a wide area network.

<Functions of Driving Assistance ECU 1>

Figure 3:
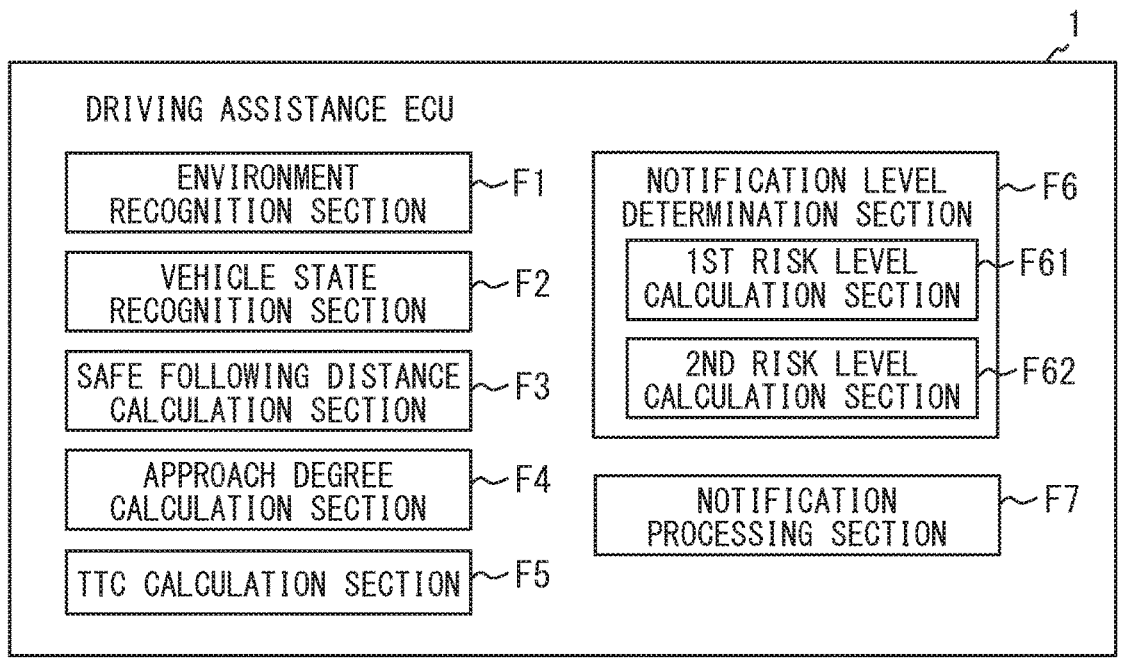
FIG. 3 is a diagram illustrating a schematic configuration of a driving assistance ECU.

The driving assistance ECU 1 provides functions corresponding to various functional blocks illustrated in FIG. 3 by executing the above driving assistance program by the CPU 11. That is, the driving assistance ECU 1 is provided with, as functional blocks, an environment recognition section F1, a vehicle state recognition section F2, a safe following distance calculation section F3, an approach degree calculation section F4, a TTC calculation section F5, a notification level determination section F6, and a notification processing section F7.

Some or all of the functional blocks included in the driving assistance ECU 1 may be implemented as hardware using a logical circuit. The mode in which some or all of the functional blocks are implemented as hardware includes a mode in which some or all of the functional blocks are implemented using one or more ICs. Further, some or all of the functional blocks included in the driving assistance ECU 1 may be implemented by the combination of execution of software by the CPU 11 and a hardware member.

The environment recognition section F1 successively acquires information about the behavior of the preceding vehicle Pv and an external environment including the weather, a road surface condition, and the brightness of the outside. Specifically, the environment recognition section F1 identifies the following distance from the preceding vehicle Pv, the relative speed Vr, and the traveling speed Vp on the basis of a detection result of the forward monitoring sensor 3. The environment recognition section F1 corresponds to the following distance acquisition section.

The traveling speed Vp of the preceding vehicle Pv may be calculated from the traveling speed Vh of the own vehicle Hv and the relative speed Vr of the preceding vehicle Pv relative to the own vehicle Hv. As another mode, the traveling speed Vp of the preceding vehicle Pv may be identified by referring to a vehicle information packet transmitted from the preceding vehicle Pv among vehicle information packets received by the short-range communication unit 4. Association between another vehicle that performs vehicle-to-vehicle communication and the preceding vehicle Pv may be performed by a known method such as a method using changes in the position relative to the own vehicle Hv over time.

The environment recognition section F1 stores data indicating the following distance from the preceding vehicle Pv, the relative speed Vr of the own vehicle Hv relative to the preceding vehicle Pv, and the traveling speed Vp of the preceding vehicle Pv in the RAM 13 as preceding vehicle data. The environment recognition section F1 acquires the detection result of the forward monitoring sensor 3 at a predetermined time interval (e.g., every 100 milliseconds), and generates and stores preceding vehicle data. A plurality of preceding vehicle data items generated at different time points may, for example, be sorted in the chronological order so that the latest preceding vehicle data comes first and stored in the RAM 13. Preceding vehicle data items that have been stored for a certain time may be sequentially erased.

Further, the environment recognition section F1 also identifies a road surface condition such as whether a road surface is wet, whether there is snow on the road surface, or whether the road is a paved road by analyzing an image captured by the forward monitoring camera as the forward monitoring sensor 3. The road surface condition resulting from the weather such as whether the road surface is wet may be estimated from a detection result of a rain sensor or may be estimated from an operating state of windshield wipers. Further, the road surface condition resulting from the weather may be identified by receiving weather information distributed from a center (not illustrated). The weather information may be estimated from the detection result of the rain sensor or the operating state of the windshield wipers. Of course, the weather information may be acquired by receiving weather information distributed from the center. The brightness of the outside can be identified from a detection result of an illuminance sensor (not illustrated) or an image captured by the forward monitoring camera.

Further, the environment recognition section F1 of the present embodiment acquires vehicle position data indicating the current position of the own vehicle Hv and map data around the own vehicle Hv from the locator 6. The environment recognition section F1 acquires another-vehicle information items supplied from the short-range communication unit 4, and classifies the acquired another-vehicle information items for respective vehicles and stores the classified information items in the RAM 13. A plurality of another-vehicle information items acquired at different time points for a certain vehicle may, for example, be sorted in the chronological order so that the latest another-vehicle information comes first and stored. Another-vehicle information items that have been stored for a certain time may be sequentially erased.

The vehicle state recognition section F2 successively identifies a state of the own vehicle Hv on the basis of a signal input from the vehicle state sensor 5. For example, the vehicle state recognition section F2 successively identifies the traveling speed Vh of the own vehicle Hv, the steering angle, the accelerator depressing amount, the brake depressing amount, the operating state of blinkers, an acceleration acting on the own vehicle Hv. Data indicating the traveling speed Vh of the own vehicle Hv is stored in the RAM 13 as own-vehicle data. A plurality of own-vehicle data items generated at different time points may, for example, be sorted in the chronological order so that the latest own-vehicle data comes first and stored in the RAM 13. Own-vehicle data items that have been stored for a certain time may be sequentially erased.

Figure 4:
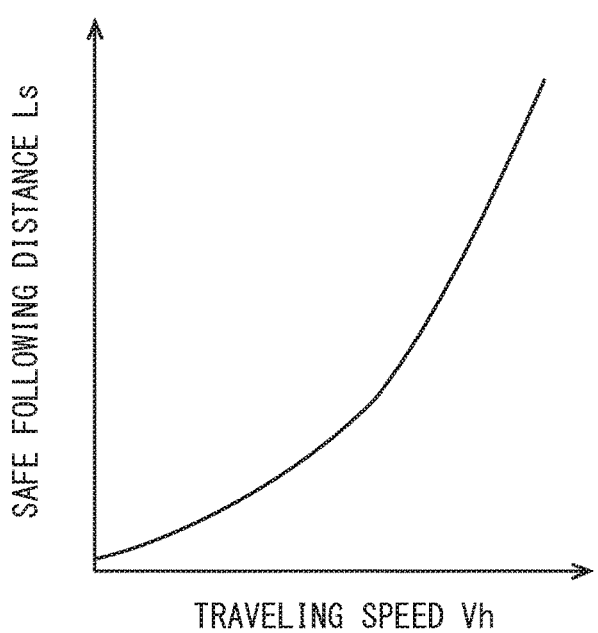
FIG. 4 is a diagram illustrating the relationship between a safe following distance Ls and a traveling speed.

The safe following distance calculation section F3 calculates a predetermined safe following distance Ls corresponding to the current traveling speed of the own vehicle Hv. The safe following distance Ls is a parameter indicating an appropriate following distance from the preceding vehicle Pv corresponding to the traveling speed Vh of the own vehicle Hv. The safe following distance Ls for each traveling speed Vh is appropriately designed by a designer. As illustrated in FIG. 4, the safe following distance Ls is designed to be a larger value as the traveling speed Vh of the own vehicle Hv increases. Data indicating the correspondence relationship between the traveling speed and the safe following distance Ls may be previously designed and stored in the flash memory 12.

FIG. 4 illustrates a mode in which the safe following distance Ls increases in a curved manner according to the traveling speed. However, the present disclosure is not limited thereto. The safe following distance Ls may be set in such a manner that the safe following distance Ls increases linearly or in a step-wise manner as the traveling speed Vh increases.

The safe following distance Ls may be set to a larger value as another traveling environment such as the brightness outside the cabin or the weather becomes worse. That is, the safe following distance Ls may be determined by a traveling environment other than the traveling speed Vh of the own vehicle Hv, such as a time zone (e.g., day/night) or the weather. However, the safe following distance Ls is a parameter that is determined without depending on (in other words, without using) the traveling speed Vp of the preceding vehicle Pv. The parameter determined without depending on the traveling speed Vp of the preceding vehicle Pv corresponds to a parameter that is determined without depending on the relative speed Vr of the own vehicle Hv relative to the preceding vehicle Pv.

When the preceding vehicle Pv is present, the approach degree calculation section F4 calculates an approach degree D by dividing the safe following distance Ls by an actual following distance L from the preceding vehicle Pv (hereinbelow, the actual following distance L), the actual following distance being acquired by the environment recognition section F1. The approach degree D is a parameter indicating whether the following distance between the preceding vehicle Pv and the own vehicle Hv is sufficiently kept. Of course, a state in which the following distance between the preceding vehicle Pv and the own vehicle Hv is insufficient corresponds to a state in which the degree of risk of a collision of the own vehicle Hv with the preceding vehicle Pv is relatively high. Thus, the approach degree D functions as a parameter indicating the degree of risk of a collision of the own vehicle Hv with the preceding vehicle Pv.

The approach degree D becomes a larger value as the actual following distance L becomes shorter relative to the safe following distance Ls. That is, a higher approach degree D means a higher degree of risk of a collision of the own vehicle Hv with the preceding vehicle Pv. When the actual following distance L is equal to the safe following distance Ls, the approach degree D is 1. The approach degree D calculated by the approach degree calculation section F4 is successively supplied to the notification level determination section F6. The approach degree calculation section F4 corresponds to the first index value calculation section, and the approach degree D corresponds to the first risk index value.

When the relative speed Vr of the own vehicle Hv relative to the preceding vehicle Pv is a positive value (that is, the own vehicle Hv is approaching the preceding vehicle Pv), the TTC calculation section F5 successively calculates a time-to-collision which is the time left for the own vehicle Hv to collide with the preceding vehicle Pv (hereinbelow, the TTC). A known algorithm can be used as a TTC calculation algorithm. For example, the TTC may be obtained by dividing the actual following distance L by the relative speed Vr of the own vehicle Hv relative to the preceding vehicle Pv. Calculation results of the TTC calculation section F5 are successively supplied to the notification level determination section F6. Of course, when the TTC is a positive value, a larger value of the TTC means a lower degree of risk of a collision of the own vehicle Hv with the preceding vehicle Pv.

When the preceding vehicle Pv is not present or when the relative speed Vr is a negative value, the calculation of the TTC itself may be stopped or a maximum value that is settable as the TTC on the program (hereinbelow, the MAX value) may be set. The case where the relative speed Vr is a negative value corresponds to a case where the preceding vehicle Pv and the own vehicle Hv are moving away from each other. In the present embodiment, as an example, when the preceding vehicle Pv is not present or when the relative speed Vr is a negative value, the MAX value is set as the TTC. The MAX value functions as a value representing infinity for convenience. Also when the relative speed Vr is 0, the MAX value is set as the TTC. The TTC calculation section F5 corresponds to the second index value calculation section, and the TTC corresponds to the second risk index value.

The notification level determination section F6 determines a notification level indicating how strongly the risk of a collision with the preceding vehicle Pv is notified to the driver on the basis of the approach degree D calculated by the approach degree calculation section F4 and the TTC calculated by the TTC calculation section F5. The notification level determination section F6 is provided with, as more detailed elements (in other words, sub functions) to determine the notification level, a first risk level calculation section F61 and a second risk level calculation section F62.

The first risk level calculation section F61 calculates a first risk level based on an element other than the traveling speed Vp of the preceding vehicle Pv, such as the traveling speed Vh of the own vehicle Hv or the road surface condition, on the basis of the approach degree D calculated by the approach degree calculation section F4. In the present embodiment, as an example, the first risk level calculation section F61 determines the first risk level in four stages of levels 1 to 4. The level 1 corresponds to a state having the lowest first risk level and having substantially no (in other words, a sufficiently small) risk of a collision with the preceding vehicle Pv. The level 4 corresponds to a state having the highest first risk level in which the driver should be alerted.

Figure 5:
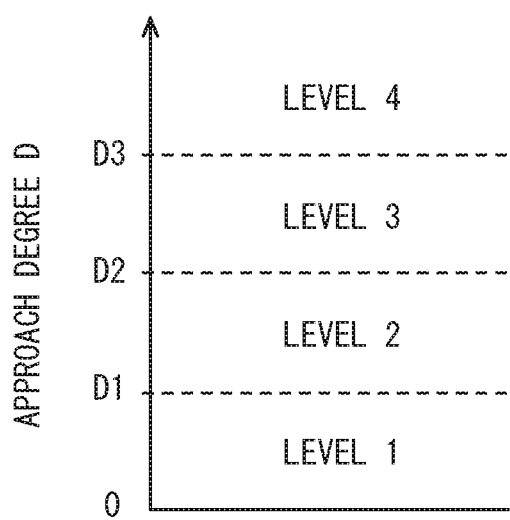
FIG. 5 is a diagram for describing the operation of a first risk level calculation section.

As illustrated in FIG. 5, the first risk level calculation section F61 determines the first risk level to be higher as a value of the approach degree D becomes larger. Specifically, the first risk level calculation section F61 determines that the first risk level is the level 1 when the approach degree D is less than a predetermined threshold D1 and determines that the first risk level is the level 2 when the approach degree D is the threshold D1 or more and less than a threshold D2. The first risk level calculation section F61 determines that the first risk level is the level 3 when the approach degree D is the threshold D2 or more and less than a threshold D3. The first risk level calculation section F61 determines that the first risk level is the level 4 when the approach degree D is the threshold D3 or more.

The threshold D1 may be appropriately designed, and is set to 1.0 in the present embodiment. The threshold D2 may be appropriately designed within a range larger than the threshold D1, and is set to 1.5 in the present embodiment as an example. The threshold D3 may be appropriately designed within a range larger than the threshold D2, and is set to 2.0 in the present embodiment as an example.

The second risk level calculation section F62 calculates a second risk level based on the relative speed Vr of the own vehicle Hv relative to the preceding vehicle Pv on the basis of the TTC calculated by the TTC calculation section F5. In the present embodiment, as an example, the second risk level calculation section F62 determines the second risk level in three stages of levels 1 to 3. The level 1 is a state having the lowest second risk level. The level 1 corresponds to a state having substantially no (in other words, a sufficiently small) risk of a collision with the preceding vehicle Pv if the current relative speed Vr is maintained. The level 3 corresponds to a state having the highest second risk level in which the driver should be alerted.

Figure 6:
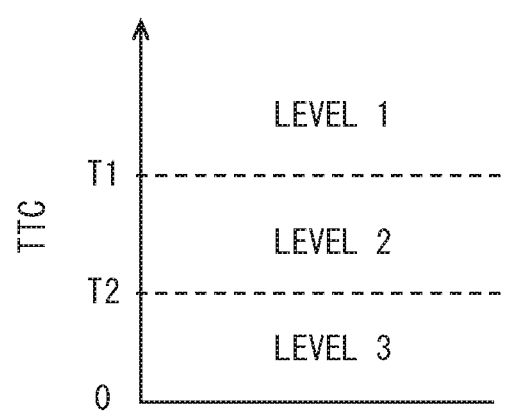
FIG. 6 is a diagram for describing the operation of a second risk level calculation section.

As illustrated in FIG. 6, the second risk level calculation section F62 determines the second risk level to be higher as a value of the TTC becomes smaller. Specifically, the second risk level calculation section F62 determines that the second risk level is the level 1 when the TTC is a predetermined threshold T1 or more and determines that the second risk level is the level 2 when the TTC is less than the threshold T1 and a threshold T2 or more. The second risk level calculation section F62 determines that the second risk level is the level 3 when the TTC is less than the threshold T2.

A specific value of the threshold T1 may be appropriately set in accordance with various tests, and is 14 seconds in the present embodiment. The configuration in which the threshold T1 is set to 14 seconds is a configuration that takes into consideration a nature such that the driver perceives an approach to the preceding vehicle Pv by an increasing rate of the visual size of the preceding vehicle Pv. In an area where the TTC is 14 seconds or more, it is difficult for the driver to perceive a change in the size of the preceding vehicle Pv. Accordingly, it is difficult for the driver to perceive an approach to the preceding vehicle Pv. The area where the TTC is 14 seconds or more corresponds to an area where even when a warning is issued, it is difficult for the driver to understand the meaning of the warning, and, on the contrary, the warning may annoy the driver. In view of the nature of the driver as described above, when the TTC is 14 seconds or more, preferably, it is determined that there is substantially no risk of a collision (that is, the level 1).

Figure 7:
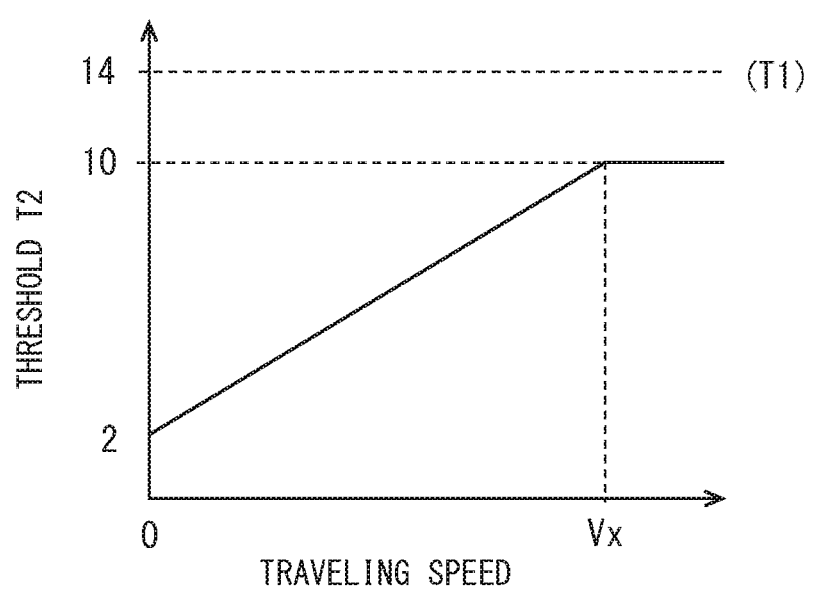
FIG. 7 is a diagram illustrating an example of a control mode when a threshold T1 is determined according to the traveling speed.

The threshold T2 may be appropriately designed within a range smaller than the threshold T1, and is set to 5 seconds in the present embodiment as an example. The threshold T2 may be dynamically determined according to the traveling speed Vh of the own vehicle Hv. For example, as illustrated in FIG. 7, the threshold T2 may be set in such a manner that a value of the threshold T2 becomes larger as the traveling speed increases. An upper limit value is set in the threshold T2 so that the threshold T2 does not exceed the threshold T1. The upper limit value of the threshold T2 may be appropriately designed within a range smaller than the threshold T1. FIG. 7 illustrates a mode in which the upper limit value of the threshold T2 is set to 10 seconds. In FIG. 7, Vx indicates the traveling speed when the threshold T2 reaches the upper limit value. For example, Vx may be 100 km/h.

The notification level determination section F6 successively determines the notification level on the basis of the first risk level calculated by the first risk level calculation section F61 and the second risk level calculated by the second risk level calculation section F62 in the above manner. In the present embodiment, as an example, the notification level determination section F6 determines the notification level in four stages of levels 0 to 3 (that is, in a plurality of stages) including a level in which no notification process is performed.

The level 0 is a level for performing no notification process. The level 1 is a level for notifying the driver that the following distance from the preceding vehicle Pv is slightly short with a strength that does not annoy the driver. The level 2 is a level for more strongly urging the driver to be careful not to collide with the preceding vehicle Pv than the level 1. The level 2 is a level for urging the driver to turn the eyes ahead of the vehicle even if the driver is looking aside or in a low awake state. The level 3 is a level for more strongly urging the driver to be careful not to collide with the preceding vehicle Pv than the level 2. The level 3 is a level for reliably notifying the driver of the risk of a collision with the preceding vehicle Pv. The details of a notification mode in each of the notification levels will be separately described below.

For example, the notification level determination section F6 determines the notification level using data indicating the correspondence relationship between the first risk level, the second risk level, and the notification level as illustrated in FIG. 8. As illustrated in FIG. 8, the notification level determination section F6 determines the notification level to be higher as the first risk level becomes higher or the second risk level becomes higher. The operation of the notification level determination section F6 will be separately described below.

The notification processing section F7 performs a process for notifying the driver of the risk of a collision with the preceding vehicle Pv (that is, the notification process) in a notification mode corresponding to the notification level determined by the notification level determination section F6.

For example, when the notification level is set to 1, the notification processing section F7 displays an image that alerts the driver to the following distance from the preceding vehicle Pv (hereinbelow, the alert image) on the display 2B and causes the peripheral vision device 2C to gradually light up until the luminance thereof becomes a predetermined target luminance. At this time, the final luminance of the peripheral vision device 2C is set to the luminance that does not annoy the driver. That is, when the notification level is 1, the notification processing section F7 causes the peripheral vision device 2C to faintly light up. The light emitting color may be a color that weakly alerts the driver, such as yellowish green, yellow, or orange.

When the notification level is set to 2, the notification processing section F7 outputs a warning sound from the speaker 2A while displaying the alert image on the display 2B. The warning sound output in the notification level 2 is set to a low sound relative to a warning sound output in the notification level 3 (described below). The length and the repeat interval of the sound are set to relatively long values. The sound pressure is set to a relatively small value.

When the notification level is set to 2, the notification processing section F7 causes the peripheral vision device 2C to blink at a relatively long interval (in other words, slowly). The light emitting color may be the same as the color in the notification level 1 or more reddish than the color in the notification level 1. When the notification level is set to 2, the notification processing section F7 causes the tactile device 2D to vibrate in a relatively weak vibration pattern.

When the notification level is set to 3, the notification processing section F7 displays a predetermined warning image on the display 2B. The warning image is an image that strongly alerts (that is, warns) the driver to the following distance from the preceding vehicle Pv and can be expected to more strongly give the driver a sense of crisis than the alert image. For example, when a background color of the alert image is yellow, a background color of the warning image may be red. When the notification level is set to 3, the notification processing section F7 outputs a warning sound from the speaker 2A. The warning sound output in the notification level 3 is set to a high sound relative to the warning sound output in the notification level 2. The length and the repeat interval of the sound are set to relatively short values. The sound pressure is set to a relatively strong value.

When the notification level is set to 3, the notification processing section F7 causes the peripheral vision device 2C to blink at a relatively short interval (in other words, quickly). The light emitting color may be more reddish than the color in the notification level 2 (e.g., red). When the notification level is set to 3, the notification processing section F7 causes the tactile device 2D to vibrate in a relatively strong vibration pattern.

FIG. 9 is a diagram illustrating a mode of the operation of each of the notification devices (in other words, the notification mode) for each of the notification levels described above. The notification mode for each of the notification levels illustrated in FIG. 9 is an example and can be appropriately changed. However, when the notification level is higher, a mode that more strongly notifies the driver that the following distance from the preceding vehicle Pv is short, in other words, the risk of the collision is high is set. Strongly notifying the driver of predetermined information corresponds to enhancing visual, tactile, and auditory stimulus given to the driver.

<Notification Related Process>

Figure 10:
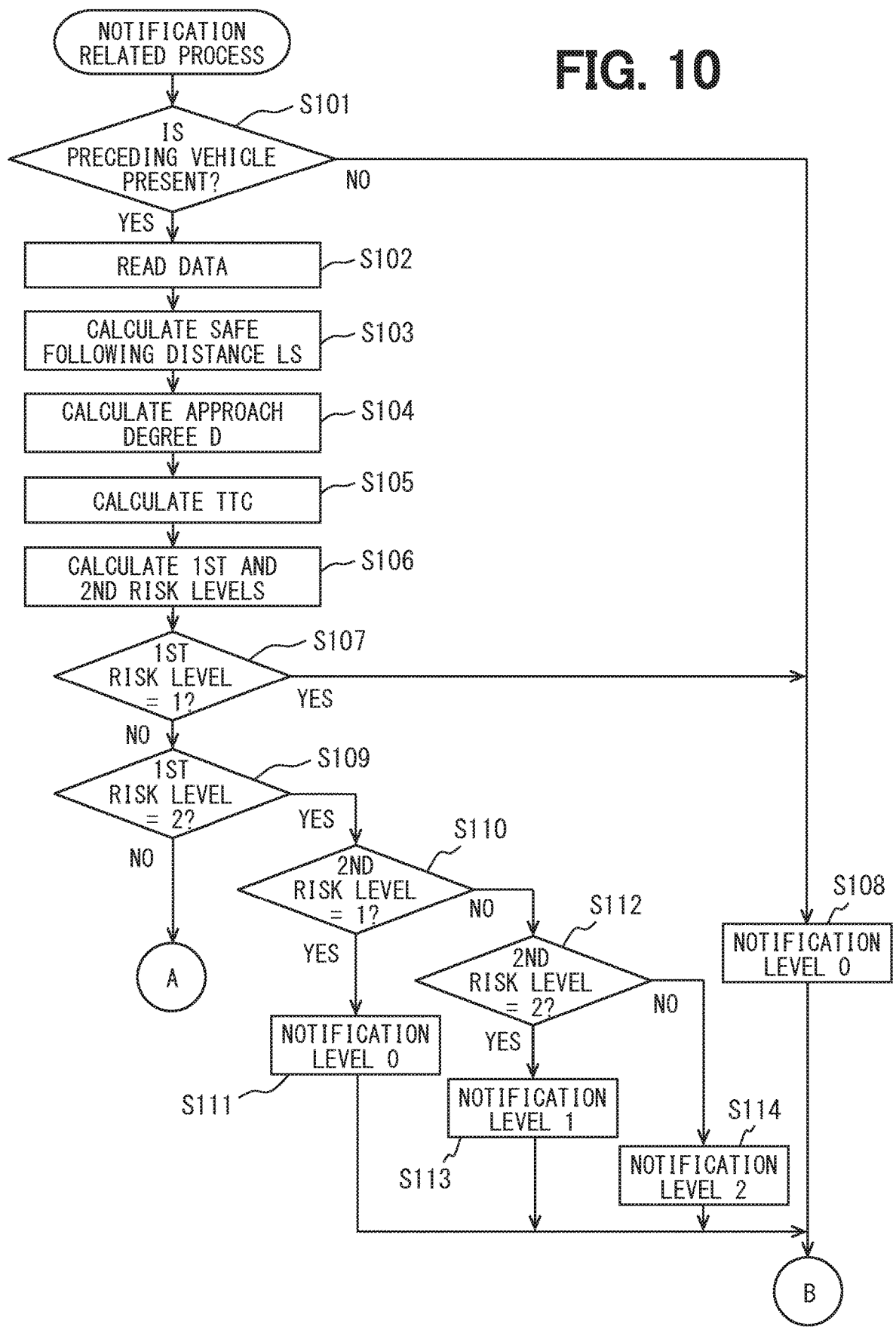
FIG. 10 is a flowchart for describing a notification related process performed by the driving assistance ECU.
Figure 11:
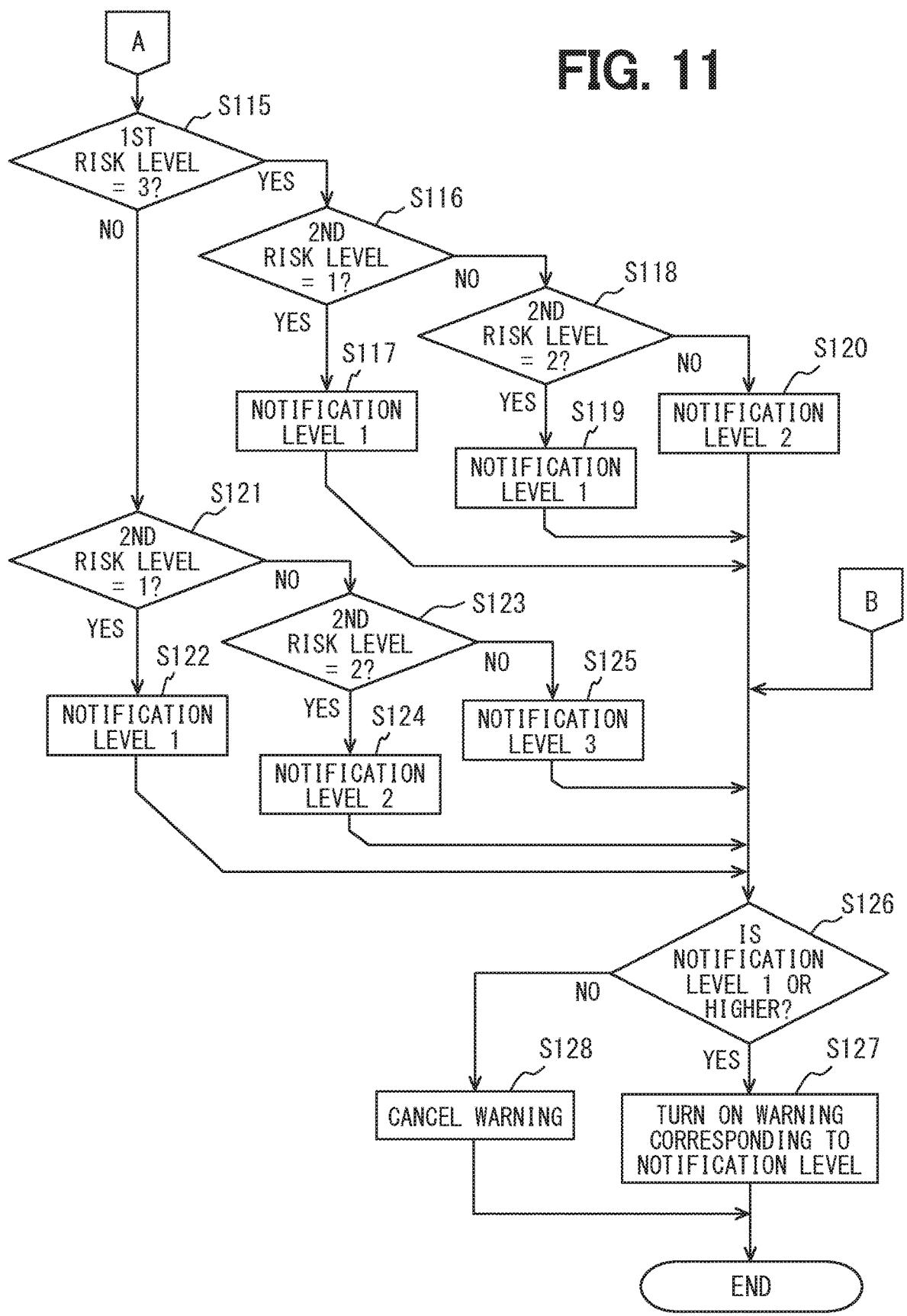
FIG. 11 is a diagram illustrating the rest of the flowchart illustrated in FIG. 10.

Next, a notification related process performed by the driving assistance ECU 1 will be described with reference to a flowchart illustrated in FIGS. 10 and 11. The notification related process is a process for starting a notification process in a mode corresponding to the notification level and cancelling (in other words, stopping) the notification process in matters. The flowchart illustrated in FIGS. 10 and 11 may be successively (e.g., every 100 milliseconds) executed while a traveling power source (e.g., an ignition power source) of the own vehicle Hv is on.

First, in step S101, the notification level determination section F6 determines whether a preceding vehicle Pv is present. Whether the preceding vehicle Pv is present is determined on the basis of a detection result of the forward monitoring sensor 3. When the preceding vehicle Pv is present, an affirmative determination is made in step S101, and the process shifts to step S102. On the other hand, when no preceding vehicle Pv is present, a negative determination is made in step S101, and the process shifts to step S108.

In step S102, data required to calculate the approach degree D and the TTC such as the traveling speed Vh of the own vehicle Hv, the actual following distance L, and the relative speed Vr of the own vehicle Hv relative to the preceding vehicle Pv is read from the RAM 13, and the process shifts to step S103.

In step S103, the safe following distance calculation section F3 calculates the safe following distance Ls corresponding to the traveling speed Vh of the own vehicle Hv, and the process shifts to step S104. In step S104, the approach degree calculation section F4 calculates the approach degree D by dividing the safe following distance Ls calculated in step S103 by the actual following distance L, and the process shifts to step S105. In steps S105, the TTC calculation section F5 calculates the TTC by dividing the actual following distance L by the relative speed Vr of the own vehicle Hv relative to the preceding vehicle Pv, and the process shifts to step S106.

In step S106, the first risk level calculation section F61 calculates the current first risk level on the basis of the approach degree D calculated in step S104. Further, the second risk level calculation section F62 calculates the current second risk level on the basis of the TTC calculated in step S105. Upon completion of these arithmetic processes, the process shifts to step S107.

In step S107, the notification level determination section F6 determines whether the current first risk level is 1. When the first risk level is 1, an affirmative determination is made in step S107, and the process shifts to step S108. On the other hand, when the first risk level is not 1, a negative determination is made in step S107, and the process shifts to step S109. In step S108, the notification level determination section F6 sets the notification level to 0, and the process shifts to step S126.

In step S109, the notification level determination section F6 determines whether the current first risk level is 2. When the first risk level is 2, an affirmative determination is made in step S109, and the process shifts to step S110. On the other hand, when the first risk level is not 2, a negative determination is made in step S109, and the process shifts to step S115.

In step S110, the notification level determination section F6 determines whether the current second risk level is 1. When the second risk level is 1, an affirmative determination is made in step S110, and the process shifts to step S111. On the other hand, when the second risk level is not 1, a negative determination is made in step S110, and the process shifts to step S112. In step S111, the notification level determination section F6 sets the notification level to 0, and the process shifts to step S126.

In step S112, the notification level determination section F6 determines whether the current second risk level is 2. When the second risk level is 2, an affirmative determination is made in step S112, and the process shifts to step S113. On the other hand, when the second risk level is not 2, that is, when the second risk level is 3, a negative determination is made in step S112, and the process shifts to step S114. In step S113, the notification level determination section F6 sets the notification level to 1, and the process shifts to step S126. In step S114, the notification level determination section F6 sets the notification level to 2, and the process shifts to step S126.

In step S115, the notification level determination section F6 determines whether the current first risk level is 3. When the first risk level is 3, an affirmative determination is made in step S115, and the process shifts to step S116. On the other hand, when the first risk level is not 3, that is, when the first risk level is 4, a negative determination is made in step S115, and the process shifts to step S121.

In step S116, the notification level determination section F6 determines whether the current second risk level is 1. When the second risk level is 1, an affirmative determination is made in step S116, and the process shifts to step S117. On the other hand, when the second risk level is not 1, a negative determination is made in step S116, and the process shifts to step S118. In step S117, the notification level determination section F6 sets the notification level to 1, and the process shifts to step S126.

In step S118, the notification level determination section F6 determines whether the current second risk level is 2. When the second risk level is 2, an affirmative determination is made in step S118, and the process shifts to step S119. On the other hand, when the second risk level is not 2, that is, when the second risk level is 3, a negative determination is made in step S119, and the process shifts to step S120. In step S119, the notification level determination section F6 sets the notification level to 1, and the process shifts to step S126. In step S120, the notification level determination section F6 sets the notification level to 2, and the process shifts to step S126.

In step S121, the notification level determination section F6 determines whether the current second risk level is 1. When the second risk level is 1, an affirmative determination is made in step S121, and the process shifts to step S122. On the other hand, when the second risk level is not 1, a negative determination is made in step S121, and the process shifts to step S123. In step S122, the notification level determination section F6 sets the notification level to 1, and the process shifts to step S126.

In step S123, the notification level determination section F6 determines whether the current second risk level is 2. When the second risk level is 2, an affirmative determination is made in step S123, and the process shifts to step S124. On the other hand, when the second risk level is not 2, that is, when the second risk level is 3, a negative determination is made in step S123, and the process shifts to step S125. In step S124, the notification level determination section F6 sets the notification level to 2, and the process shifts to step S126. In step S125, the notification level determination section F6 sets the notification level to 3, and the process shifts to step S126.

In step S126, the notification processing section F7 determines whether the notification level determined in the above process is 1 or higher. When the notification level is 1 or higher, an affirmative determination is made in step S126, and the process shifts to step S127. On the other hand, when the notification level is 0, a negative determination is made in step S126, and the process shifts to step S128. The case where the notification level is 1 or higher corresponds to a case where it is necessary to perform the notification process. The case where the notification level is 0 corresponds to a case where it is not necessary to perform the notification process. That is, the process of step S126 corresponds to a process for determining whether it is necessary to start/continue the notification process.

In step S127, the notification processing section F7 performs the notification process in a notification mode corresponding to the current notification level. For example, when the notification process has already been performed at the start point of the flow, and the notification level determined in the previous notification related process and the notification level determined in the current notification related process differ from each other, the notification mode is changed to the notification level determined this time. When no notification process has been performed at the start point of the flow, and the notification level determined in the current notification related process is 1 or higher, the notification process in the mode corresponding to the notification level determined this time is started.

When the notification process has already been performed at the start point of the flow, and the notification level determined in the previous notification related process and the notification level determined in the current notification related process are the same as each other, the notification process in the mode that has been performed before the start of the flow may be continued.

In step S128, the notification processing section F7 stops the notification process. When no notification process has been performed at the start point of the flow, a state in which no notification process is executed may be continued.

<Summary of Embodiment>

In the above embodiment, the notification level which determines the mode of the notification process is determined by the two parameters: the first risk level and the second risk level. The first risk level is determined according to the approach degree D which is calculated without using the traveling speed Vp of the preceding vehicle Pv. Thus, the first risk level is a parameter that is calculated without using the traveling speed Vp of the preceding vehicle Pv.

On the other hand, the second risk level is determined according to the TTC. The TTC is calculated on the basis of the relative speed Vr of the own vehicle Hv relative to the preceding vehicle Pv. Thus, the second risk level is a parameter that is calculated using the relative speed Vr of the own vehicle Hv relative to the preceding vehicle Pv, that is, using the traveling speed Vp of the preceding vehicle Pv. That is, according to the configuration of the present embodiment, the notification level is determined using both the first risk level which is calculated without using the traveling speed Vp of the preceding vehicle Pv and the second risk level which is calculated using the traveling speed Vp of the preceding vehicle Pv.

In such a configuration, when the driver performs a deceleration operation, the relative speed Vr of the own vehicle Hv relative to the preceding vehicle Pv decreases. The second risk level is a parameter that is determined according to the relative speed Vr. Thus, when the driver performs a deceleration operation, the second risk level also drops in response to the deceleration operation.

As described above, the notification level is determined also by the second risk level. Thus, when the second risk level drops, the notification level may also drop. Of course, when the notification level drops, the notification mode of the notification process changes to a relatively weak mode or the notification process itself stops. Thus, the notification mode may change in response to the deceleration operation by the driver even under the condition where the following distance has not much changed yet. Thus, it is possible to reduce the possibility of annoying the driver by continuing the notification in the same notification mode.

When the preceding vehicle Pv suddenly decelerates, the second risk level rises with an increase in the relative speed Vr, which may raise the notification level, even at the point when the following distance has not largely changed yet. Of course, when the notification level rises, the notification mode of the notification process also changes to a relatively strong notification mode. Thus, according to the above configuration, it is also possible to reduce the possibility that the driver does not immediately notice sudden braking of the preceding vehicle Pv. That is, according to the above configuration, it is possible to notify the driver of the risk in a more appropriate notification mode.

Figure 12:
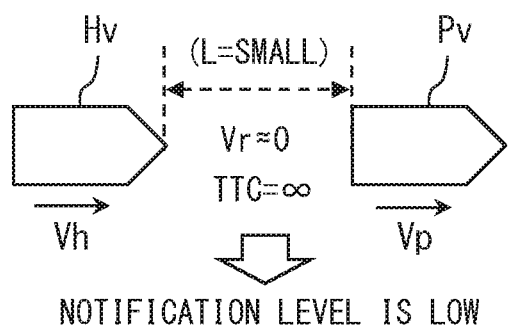
FIG. 12 is a diagram for describing the operation of a first assumed configuration.

As another configuration that notifies the risk of a collision with the preceding vehicle Pv, a configuration that determines the notification level on the basis of only the TTC is assumed (hereinbelow, the first assumed configuration). However, even when the actual following distance L is extremely small as illustrated in FIG. 12, the TTC becomes a relatively large value when the relative speed Vr is sufficiently low. When the actual following distance L is short even though the TTC is large, there is only a short time allowance for the driver to perform an operation for avoiding a collision with the preceding vehicle Pv when the preceding vehicle Pv is suddenly braked at the next moment. Thus, the degree of risk of a collision is potentially high. That is, in the first assumed configuration, it is not possible to perform the notification process in a mode that takes a potential risk of a collision into consideration.

Figure 13:
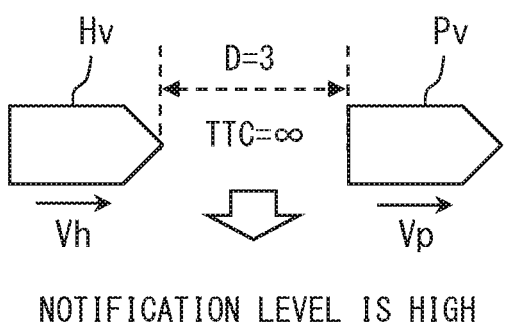
FIG. 13 is a diagram for describing an effect achieved by the configuration of the embodiment.

On the other hand, in the present embodiment, the notification level is determined taking into consideration not only the TTC, but also the approach degree D. In other words, the notification level in which a potential risk that may be present also when the TTC is large is actualized is determined. Thus, as illustrated in FIG. 13, when the actual following distance L is extremely small, a relatively high notification level is set. As a result, it is possible to more strongly notify the driver of the risk of a collision with the preceding vehicle Pv.

Figure 14:
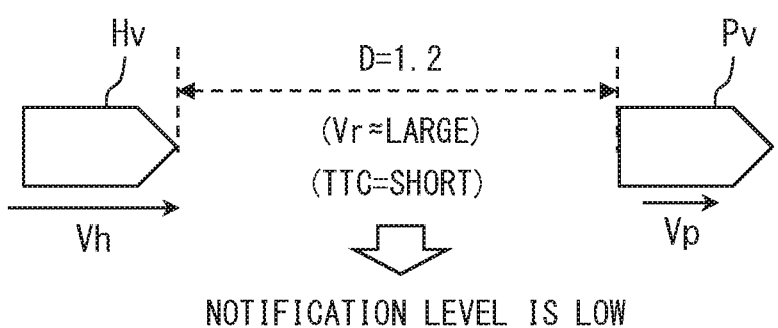
FIG. 14 is diagram for describing the operation of a second assumed configuration.

Further, as another configuration that notifies the risk of a collision with the preceding vehicle Pv, a configuration that determines the notification level on the basis of only the approach degree D as described in Patent Literature 1 is also assumed (hereinbelow, the second assumed configuration). However, even when the approach degree D is not so high as illustrated in FIG. 14, the TTC becomes a relatively small value when the relative speed Vr is high. When the TTC is small, there is only a short time allowance for the driver to perform an operation for avoiding a collision with the preceding vehicle Pv. Thus, the degree of risk of a collision is potentially high. That is, in the second assumed configuration, the notification process may not be performed in the mode that takes a potential risk of a collision into consideration.

Figure 15:
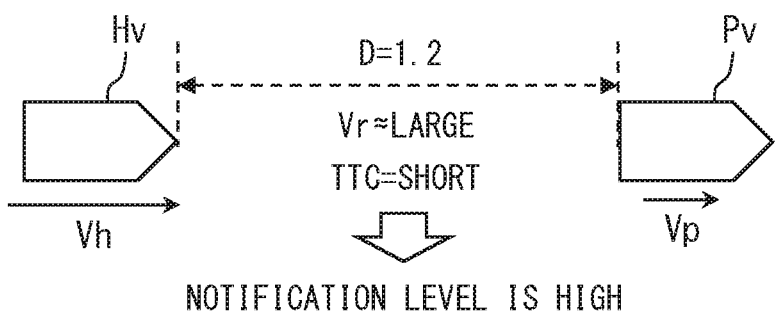
FIG. 15 is a diagram for describing an effect achieved by the configuration of the embodiment.

On the other hand, in the present embodiment, the notification level is determined taking into consideration not only the approach degree D, but also the TTC. In other words, the notification level is determined by actualizing a risk that does not appear only with the approach degree D. Thus, as illustrated in FIG. 15, even when the approach degree D is not so high, a relatively high notification level is set when the TTC is relatively short. As a result, it is possible to strongly notify the driver of the risk of a collision with the preceding vehicle Pv.

The embodiment of the present disclosure has been described above. However, the present disclosure is not limited to the above embodiment. Various modifications described below are also included in the technical scope of the present disclosure. In addition, the present disclosure can be variously modified without departing from the gist thereof. The various modifications may be combined.

A member having the same function as the member described in the above embodiment will be designated by the same reference sign, and description thereof will be omitted. When only a part of the configuration is mentioned, the configuration of the embodiment described above can be applied to the other part thereof.

[First Modification]

Figure 16:
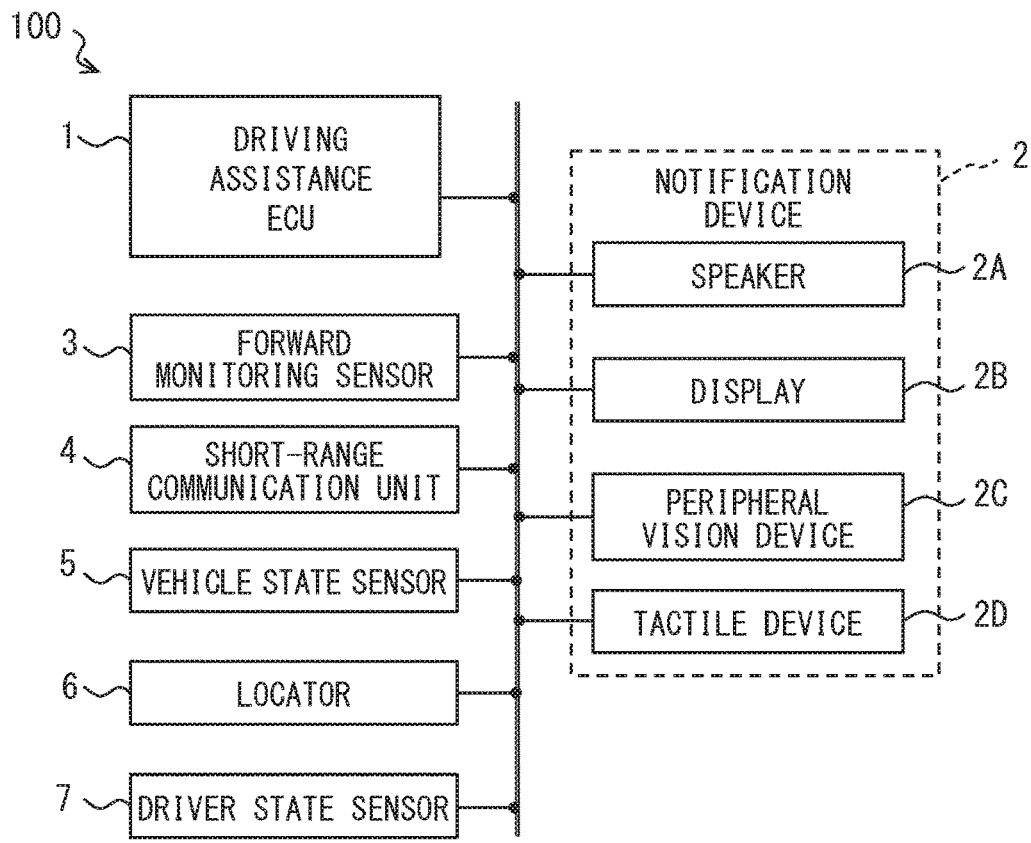
FIG. 16 is a block diagram illustrating a schematic configuration of a driving assistance system of a first modification.

The notification level determination section F6 may determine the notification level taking into consideration a state of the driver such as whether the driver is in a looking-aside state. Hereinbelow, such a configuration will be described as a first modification. As illustrated in FIG. 16, a driving assistance system 100 of the first modification is provided with a driving assistance ECU 1, a notification device 2, a forward monitoring sensor 3, a short-range communication unit 4, a vehicle state sensor 5, a locator 6, and a driver state sensor 7.

The driver state sensor 7 detects the state of the driver. The state of the driver includes, for example, the direction of the face of the driver, the direction of the line of sight, an opening degree of the eyelid, the direction of the body (in other words, a seated posture), and a steering wheel holding state. Further, biological information of the driver such as a heart rate, a blood pressure, a cardiac potential, a pulse wave, a perspiration amount, a body temperature, a respiration rhythm, and the depth of breathing also functions as information indicating the state of the driver. Further, whether the driver is having a conversation with a fellow passenger is also included in the state of the driver.

For example, a driver camera which is disposed to capture an image of the face part of the driver, a microphone, a steering wheel holding sensor, a back pressure sensor, a seating pressure sensor, or a biological information sensor can be employed as the driver state sensor 7 as described above. The driver camera captures an image of the face part of the driver. The driver camera may be implemented using, for example, a near-infrared light source, a near-infrared camera, and a control unit which controls the near-infrared light source and the near-infrared camera. The driver camera successively detects the head posture of an occupant on the driver's seat (that is, the driver), the direction of the face of the driver, the direction of the line of sight, and the opening degree of the eyelid by performing known image recognition processing on an image captured by the near-infrared camera. The driver camera may be disposed at an appropriately designed position such as a steering column cover or a part of the instrument panel, the part facing the driver's seat, so as to capture an image of a face area of the occupant seated on the driver's seat.

The steering wheel holding sensor is a pressure sensor sheet disposed on the steering wheel. The back pressure sensor is a pressure sensor sheet that detects the distribution of a pressure acting on a backrest of the driver's seat. The seating pressure sensor is a pressure sensor sheet that is disposed on a seating surface of the driver's seat to detect the distribution of a pressure acting on the seating surface of the driver's seat.

The biological information sensor is, for example, a heart rate sensor which measures the heart rate. A sensor that detects the blood pressure, the cardiac potential, the pulse wave, the perspiration amount, the body temperature, the respiration rhythm, or the depth of breathing is also included in the biological information sensor.

The driving assistance system 100 of the first modification is provided with at least one of the various sensors described above as the driver state sensor 7. In the first modification, as an example, the driving assistance system 100 is provided with the driver camera and the heart rate sensor as the driver state sensor 7. Each of the driver camera and the heart rate sensor as the driver state sensor 7 successively supplies data indicating a detection result to the driving assistance ECU 1. That is, the posture of the head of the driver, the direction of the face of the driver, the direction of the line of sight, the opening degree of the eyelid, and the heart rate are supplied to the driving assistance ECU 1.

Figure 17:
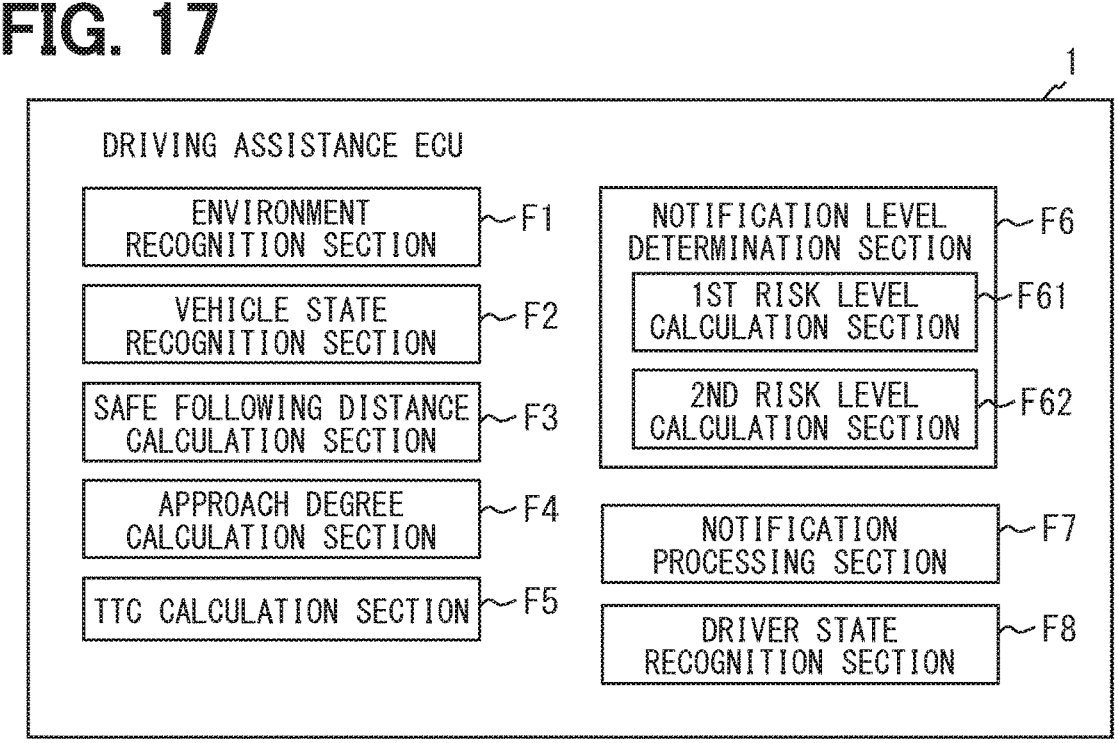
FIG. 17 is a block diagram illustrating a schematic configuration of a driving assistance ECU of the first modification.

As illustrated in FIG. 17, the driving assistance ECU 1 in the first modification is provided with a driver state recognition section F8 in addition to various functional blocks. The driver state recognition section F8 successively identifies the state of the driver on the basis of a detection result of the driver state sensor 7 and a detection result of the vehicle state sensor 5. In the present modification, the driver state recognition section F8 is implemented by execution of software by the CPU 11. However, as another mode, the driver state recognition section F8 may be implemented as hardware using an IC.

The driver state recognition section F8, for example, determines whether the driver is in a looking-aside state in which the driver is not looking ahead of the vehicle on the basis of the direction of the face or the direction of the line of sight identified by the driver camera. For example, when the face of the driver is directed in a direction that forms an angle of 20 degrees or more relative to the vehicle front direction, it is determined that the driver is in a looking-aside state.

Further, it is determined whether the driver is in a dozing state from the opening degree of the eyelid of the driver. Even when the driver is not in a dozing state, it is determined whether the driver is in a low awake state in which the level of consciousness of the driver is low on the basis of changes in the opening degree of the eyelid over time. Further, it is determined whether the driver is in a careless state on the basis of sway in the steering angle or sway in the line of sight. A method for determining the state of the driver such as the looking-aside state, the dozing state, the low awake state, and the careless state is not limited to the above method. A known method can be employed.

When the driver state recognition section F8 determines that the driver corresponds to any of the looking-aside state, the dozing state, the low awake state, and the careless state, the driver state recognition section F8 determines that the driver is in an abnormal state and sets an abnormal flag Fd indicating whether the driver is in an abnormal state to 1. When the driver state recognition section F8 determines that the driver is not in an abnormal state (in other words, in a normal state), the driver state recognition section F8 sets the abnormal flag Fd to 0. The state in which the abnormal flag Fd is set to 1 corresponds to a state in which the abnormal flag Fd is set to on. The state in which the abnormal flag Fd is set to 0 corresponds to a state in which the abnormal flag Fd is set to off.

In the present modification, as an example, the driver state recognition section F8 determines all the looking-aside state, the dozing state, the low awake state, and the careless state. However, the present disclosure is not limited thereto. Only some of the looking-aside state, the dozing state, the low awake state, and the careless state may be determined. A set value of the abnormal flag Fd is referred to by a notification level determination section F6 (in particular, a first risk level calculation section F61).

The first notification level determination section F61 of the first modification calculates the first risk level using not only the approach degree D calculated by the approach degree calculation section F4, but also a determination result of the driver state recognition section F8. Specifically, the first risk level calculation section F61 of the first modification is provided with a default threshold and an abnormal state threshold as thresholds D1 to D3 for calculating the first risk level.

The default threshold is used as the thresholds D1 to D3 when the driver state recognition section F8 determines that the driver is not in an abnormal state (in other words, in a normal state). The abnormal state threshold is used as the thresholds D1 to D3 when the driver state recognition section F8 determines that the driver is in an abnormal state. The default threshold may, for example, be the same value as the above embodiment as illustrated in FIG. 18. The abnormal state threshold is set to a small value relative to the default threshold.

In the present modification, as an example, the abnormal state threshold is set to a value smaller than the default threshold by 0.2. When the abnormal state threshold is set to a small value relative to the default threshold, the first risk level is more likely to be determined to be high. The fact that the first risk level is more likely to be determined to be high corresponds to the fact that the notification level is more likely to be determined to be high. Of course, when the notification level is more likely to be determined to be high, the timing of starting the notification process or the timing of executing the notification process in a relatively strong notification mode is advanced. That is, it is possible to advance the timing of starting the notification process or the timing of executing the notification process in a relatively strong notification mode by setting the abnormal state threshold to a small value relative to the default threshold.

Figure 19:
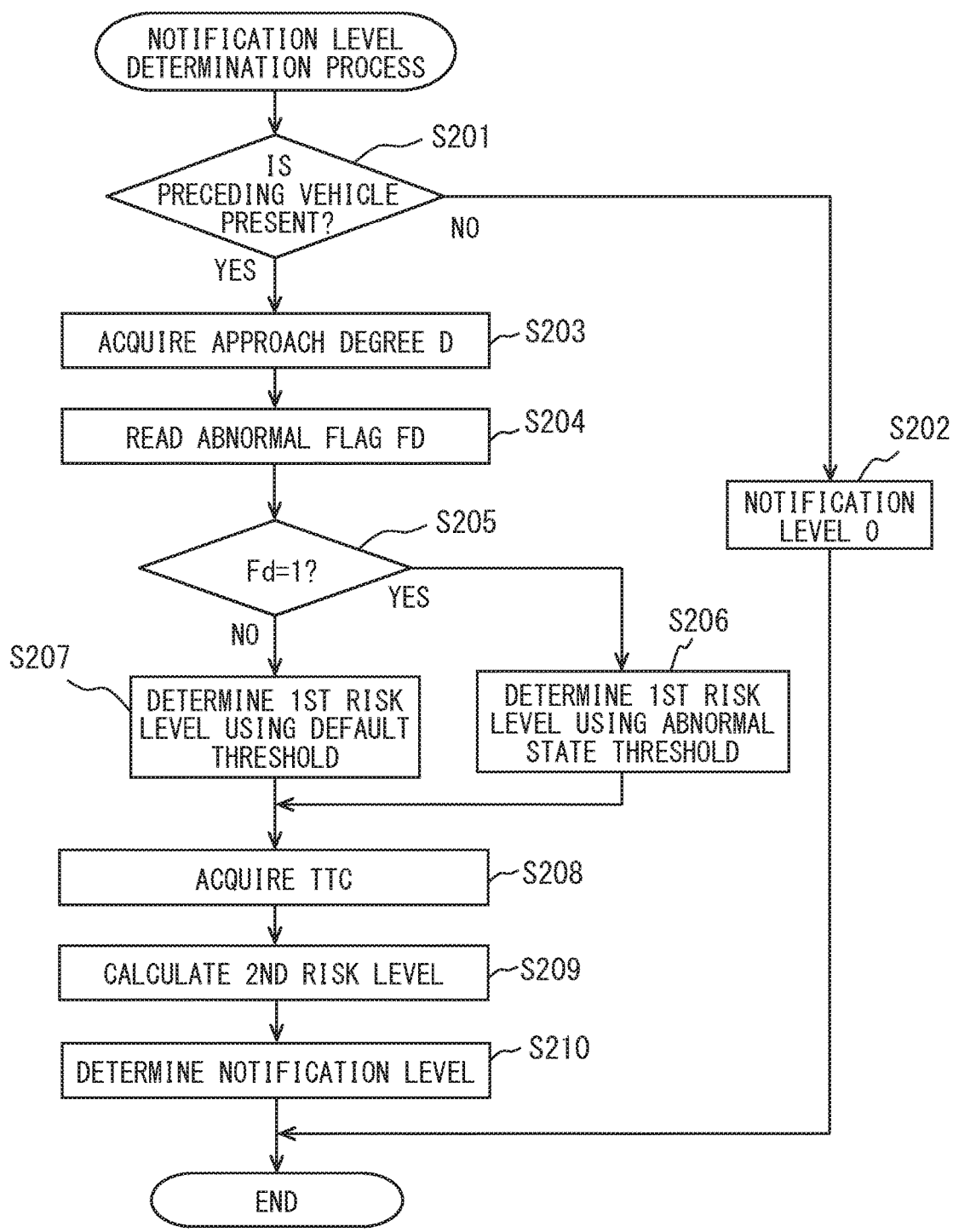
FIG. 19 is a flowchart for describing a notification level determination process performed by a notification level determination section.

Next, the operation of the notification level determination section F6 of the first modification will be described with reference to a flowchart illustrated in FIG. 19. FIG. 19 is a flowchart for describing a process for determining a notification level (hereinbelow, the notification level determination process) by the notification level determination section F6. The flowchart illustrated in FIG. 19 may be successively executed while the traveling power source of the own vehicle Hv is on in a manner similar to the notification related process of the above embodiment.

Calculation of the safe following distance Ls by the safe following distance calculation section F3, calculation of then approach degree D by the approach degree calculation section F4, and calculation of the TTC by the TTC calculation section F5 are executed independently of the flow. In other words, the notification level determination process illustrated in FIG. 19 corresponds to a process executed by the notification level determination section F6 in the notification related process performed by the driving assistance ECU 1. Each step of the flowchart illustrated in FIG. 19 is executed by the notification level determination section F6.

First, in step S201, it is determined whether a preceding vehicle Pv is present. When no preceding vehicle Pv is present, a negative determination is made in step S201, and the process shifts to step S202. On the other hand, when the preceding vehicle Pv is present, an affirmative determination is made in step S201, and the process shifts to step S202. In step S202, the notification level is set to 0, and the flow is finished.

In step S203, an approach degree D calculated by the approach degree calculation section F4 is acquired, and the process shifts to step S204. In step S204, a set value of the abnormal flag Fd is read, and the process shifts to step S205. In step S205, it is determined whether the abnormal flag Fd is set to 1. When the abnormal flag Fd is set to 1, an affirmative determination is made in step S205, and the process shifts to step S206. On the other hand, when the abnormal flag Fd is not set to 1, that is, when the abnormal flag Fd is set to 0, a negative determination is made in step S205, and the process shifts to step S207.

In step S206, the first risk level calculation section F61 calculates a first risk level corresponding to the approach degree D acquired in step S203 using a predetermined abnormal state threshold instead of the default threshold, and the process shifts to step S208. In step S207, a first risk level corresponding to the approach degree D acquired in step S203 is calculated using the default threshold, and the process shifts to step S208.

In step S208, a TTC calculated by the TTC calculation section F5 is acquired, and the process shifts to step S209. In step S209, a second risk level corresponding to the TTC acquired in step S208 is calculated, and the process shifts to step S210. In step S210, the notification level is determined on the basis of the first risk level and the second risk level determined by the above process, and the flow is finished. The same method as the above embodiment may be employed as a calculation method itself for calculating the notification level based on the first risk level and the second risk level. That is, the notification level may be determined on the basis of the correspondence table as illustrated in FIG. 8. After the finish of the flow, the notification processing section F7 performs the notification process or stops the notification process according to the determined notification level.

<Summary of First Modification>

According to the configuration of the first modification, when the driver is in a predetermined abnormal state such as the looking-aside state, the first risk level is determined using the threshold that is set so that the first risk level is more likely to be determined to be a relatively high level. According to such a configuration, the timing of starting the notification process or the timing of executing the notification process in a relatively strong notification mode is advanced. As a result, it can be expected that the timing of returning the driver from an abnormal state to a normal state or the timing of causing the driver to check ahead is advanced.

[Second Modification]

The above first modification discloses a mode in which, even when it is determined that the driver is in an abnormal state, the notification level is calculated by the same rule as the rule in the case where it is determined that the driver is in a normal state. However, the present disclosure is not limited thereto. A determination rule of the notification level may be set in such a manner that the notification level is determined to be higher when it is determined that the driver is in an abnormal state than when it is determined that the driver is in a normal state. For example, when it is determined that the driver is in a normal state, the notification level is determined using the correspondence table illustrated in FIG. 8. On the other hand, when it is determined that the driver is in an abnormal state, the notification level is determined using a correspondence table illustrated in FIG. 20.

Figures 20, 21:
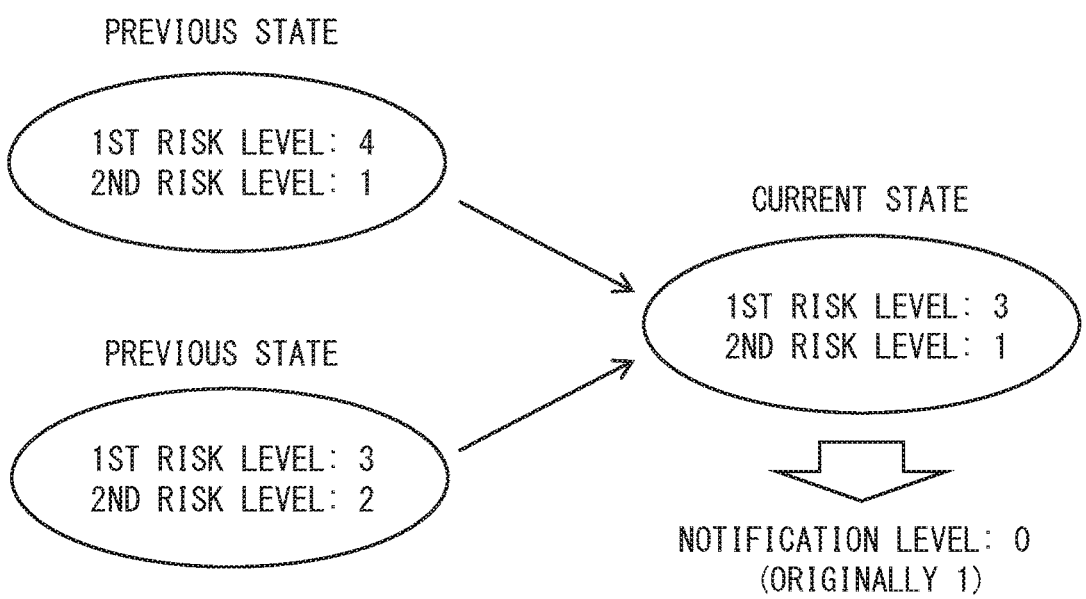
FIG. 20 is a diagram for describing the operation of a notification level determination section of a second modification.
FIG. 21 is a diagram for describing the operation of a notification level determination section of a fourth modification.

A numerical value in parentheses in FIG. 20 indicates the difference from a notification level that is set when it is determined that the driver is in a normal state. That is, in the example illustrated in FIG. 20, when the first risk level is 2 and the second risk level is 1, and it is determined that the driver is in an abnormal state, the notification level is determined to be higher by one stage than the notification level determined when it is determined that the driver is in a normal state. The same applies to the case where the first risk level is 4 and the second risk level is 1, the case where the first risk level is 3 and the second risk level is 2, the case where the first risk level is 4 and the second risk level is 2, and the case where the first risk level is 3 and the second risk level is 3.

The configuration of the second modification not only advances the start timing of the notification process, but also enhances a stimulus output by the notification process when the driver is in an abnormal state. Such a mode facilitates the driver to notice the risk of a collision with the preceding vehicle. Of course, when the driver recognizes the risk of a collision with the preceding vehicle, it can be expected that the driver performs an operation for reducing the risk of the collision such as stopping an acceleration operation or executing a deceleration operation. That is, according to the configuration of the second modification, a further increase of the safety can be expected.

[Third Modification]

The above first and second modifications disclose the mode in which the thresholds D1 to D3 for determining the first risk level are changed so that the first risk level is more likely to be determined to be higher when the driver state recognition section F8 determines that the driver is in an abnormal state than when the driver state recognition section F8 determines that the driver is in a normal state. However, the present disclosure is not limited thereto.

The thresholds T1 and T2 may be changed so that the second risk level is determined to be higher when it is determined that the driver is in an abnormal state than when it is determined that the driver is in a normal state. For example, a default threshold which is used when the driver state recognition section F8 determines that the driver is in a normal state and an abnormal state threshold which is used when the driver state recognition section F8 determines that the driver is in an abnormal state may be prepared as the thresholds T1 and T2 for determining the second risk level, and these thresholds may be properly used according to a determination result of the driver state recognition section F8.

The abnormal state threshold for determining the second risk level may be set to a value larger than the default threshold. For example, the abnormal state threshold for determining the second risk level may be a value obtained by multiplying the default threshold by a predetermined factor larger than 1 (e.g., 1.2) or a value obtained by adding a predetermined positive number (e.g., 1 second) to the default value. According to such a configuration, the second risk level is more likely to be determined to be higher when the driver state recognition section F8 determines that the driver is in an abnormal state than when the driver state recognition section F8 determines that the driver is in a normal state. As a result, the notification level is more likely to be determined to be higher when the driver is in an abnormal state than when the driver is in a normal state.

[Fourth Modification]

The notification level determination section F6 may determine the notification level taking the state of the driver into consideration in view of a state transition of the own vehicle Hv. The state transition of the own vehicle Hv indicates a change in the first risk level and a change in the second risk level. Hereinbelow, such a configuration will be described as a first modification.

When a first risk level and a second risk level are calculated, a notification level determination section F6 of a fourth modification stores the determined first and second risk levels in a RAM 13 as previous state information. When first and second risk levels are newly calculated in the next notification related process, it is determined whether the first risk level has been improved and the second risk level has been improved by referring to the first and second risk levels stored in the RAM 13 as the previous state information.

When the first risk level or the second risk level has been improved, the notification level determination section F6 determines the notification level to be lower than an original notification level determined by the current first and second risk levels. The case where the first risk level has been improved corresponds to a case where the first risk level calculated this time is lower than the first risk level calculated last time. The case where the second risk level has been improved corresponds to a case where the second risk level calculated this time is lower than the first risk level calculated last time.

For example, as illustrated in FIG. 21, when the second risk level is 1 both last time and this time, and the first risk level has dropped from 4 to 3, the notification level is set to 0. Also when the first risk level is 3 both last time and this time, and the second risk level has dropped from 2 to 1, the notification level is set to 0. As illustrated in FIG. 8, when the first risk level is 3 and the second risk level is 1, the original notification level is 1.

Figure 22:
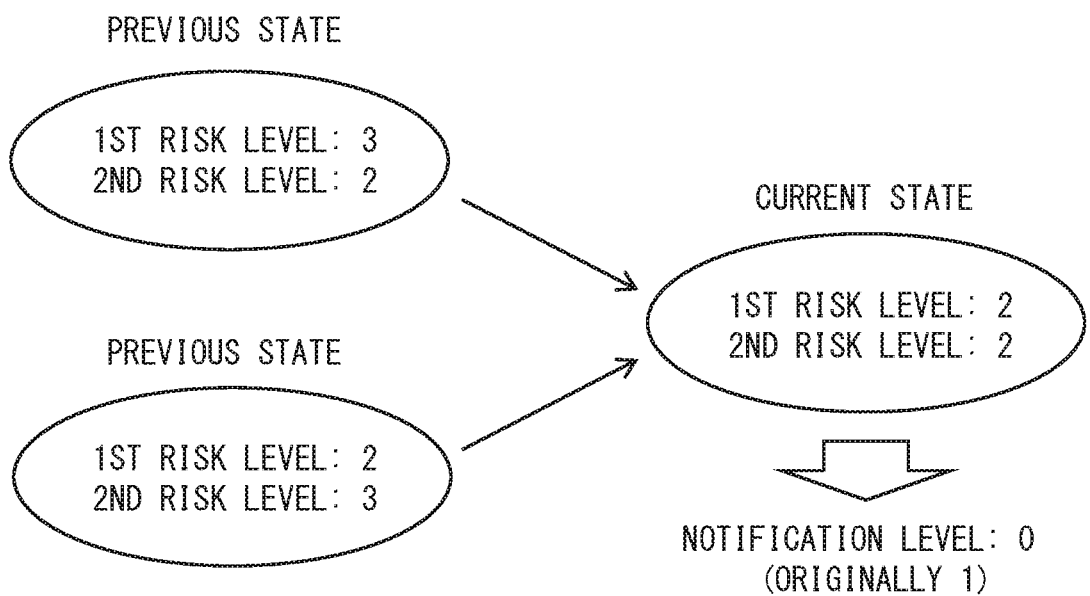
FIG. 22 is a diagram for describing the operation of the notification level determination section of the fourth modification.

As illustrated in FIG. 22, when the second risk level is 2 both last time and this time, and the first risk level has dropped from 3 to 2, the notification level is set to 0. Similarly, also when the first risk level is 2 both last time and this time, and the second risk level has dropped from 3 to 2, the notification level is set to 0. As illustrated in FIG. 8, when the first risk level is 2 and the second risk level is 2, the original notification level is 1.

Figure 23:
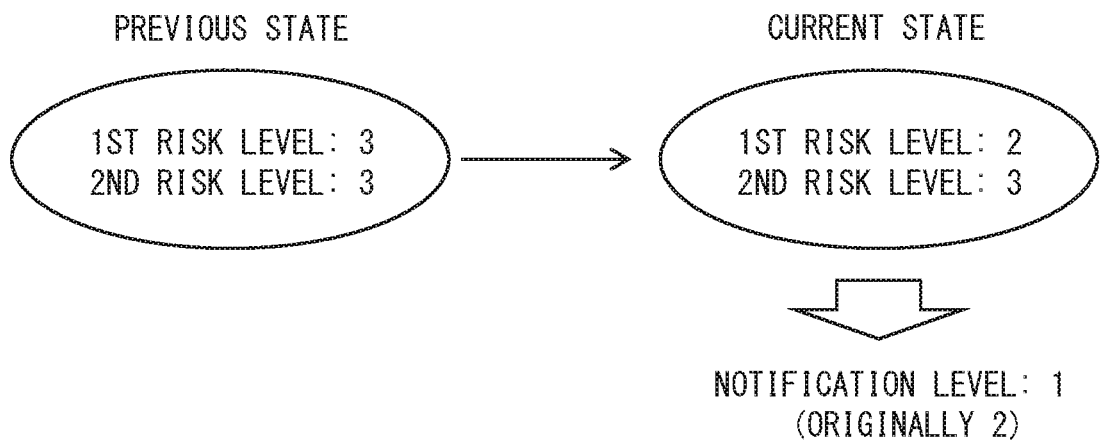
FIG. 23 is a diagram for describing the operation of the notification level determination section of the fourth modification.

As illustrated in FIG. 23, when the second risk level is 3 both last time and this time, and the first risk level has dropped from 3 to 2, the notification level is set to 1. As illustrated in FIG. 8, when the first risk level is 2 and the second risk level is 3, the original notification level is 2.

The improvement in the first risk level or the second risk level means that the positional relationship between the own vehicle Hv and the preceding vehicle Pv has shifted to a safer state by, for example, a deceleration operation by the driver. It is possible to reduce the possibility of annoying the driver by weakening the mode of the notification process or stopping the notification process early when the positional relationship between the own vehicle Hv and the preceding vehicle Pv has shifted to a safer state in this manner.

In the above, five patterns are described as an example of the state transition pattern for setting the notification level lower than the original notification level. However, the state transition pattern for setting the notification level lower than the original notification level may be appropriately selected.

Setting the notification level to a level lower than the original notification level in response to the improvement in the first risk level corresponds to setting the notification level to a level lower than the original notification level in response to the transition of a value of the approach degree D to a smaller value. The approach degree D is a parameter indicating a safer state as a value of the approach degree D becomes smaller. Thus, the transition of a value of the approach degree D to a smaller value means a shift to a safer state.

Setting the notification level to a level lower than the original notification level in response to the improvement in the second risk level corresponds to setting the notification level to a level lower than the original notification level in response to the transition of a value of the TTC to a larger value. The TTC is a parameter indicating a safer state as a value of the TTC becomes larger. Thus, the transition of a value of the TTC to a larger value means a shift to a safer state.

[Fifth Modification]

The configuration in which the second risk level is calculated on the basis of the TTC is disclosed in the above. However, an index used in calculation of the second risk level (in other words, the second risk index value) is not limited to the TTC. The second risk level calculation section F62 may calculate the second risk level using the inverse of the TTC. Further, the second risk level calculation section F62 may calculate the second risk level using a TTC2nd taking the relative speed and the relative acceleration into consideration. The second risk level can be calculated on the basis of a known risk index using the traveling speed Vp of the preceding vehicle Pv such as a margin-to-collision (MTC) other than the above risk index.

The configuration in which the first risk level is calculated using the approach degree D is disclosed in the above. However, the present disclosure is not limited thereto. The first risk level calculation section F61 may calculate the first risk level using a secure allowance time described below as the first risk index value.

The secure allowance time is a value obtained by subtracting a reaction delay time, a reaction time, and a required time headway from a current time headway. The time headway is a value obtained by dividing the actual following distance L by the traveling speed Vh of the own vehicle Hv. The reaction delay time is a delay time that is required for the driver to notice the occurrence of a risk event such as sudden braking of the preceding vehicle Pv. The reaction delay time is previously set. The reaction delay time may be adjusted to a long value during careless driving or looking-aside driving. The reaction time is the time required for the driver to start a braking operation after the driver notices the occurrence of the risk event and a parameter determined from a driving skill or the age of the driver. The reaction time is previously set. The required time headway is the time required for the driver to stop the vehicle after the start of the braking operation and a parameter determined from a road surface condition or the type and the performance of the vehicle. The required time headway is previously set. The required time headway may be adjusted to be longer as the traveling speed Vh increases. The effects described above can be achieved also when the secure allowance time is used instead of the approach degree D.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving assistance device that performs a notification process for notifying a driver of a risk of a collision with a preceding vehicle in cooperation with a predetermined notification device, the driving assistance device comprising:
    an inter-vehicular distance acquisition section that successively acquires an inter-vehicular distance between the preceding vehicle and an own vehicle;
    a first index calculator that calculates a first risk index that is a parameter indicating a degree of the risk of the collision between the preceding vehicle and the own vehicle based on a traveling speed of the own vehicle and the inter-vehicular distance acquired by the inter-vehicular distance acquisition section;
    a second index calculator that successively calculates a second risk index that is a parameter indicating the degree of the risk of the collision between the preceding vehicle and the own vehicle, the second risk index being different from the first risk index, based on a relative speed between the own vehicle and the preceding vehicle;
    a notification level determination section that successively determines a notification level indicating a strength of notification for notifying the driver of the risk of the collision with the preceding vehicle, based on the first risk index calculated by the first index calculator and the second risk index calculated by the second index calculator; and
    a notification processor that performs the notification process in a notification mode corresponding to the notification level determined by the notification level determination section, wherein:
    the notification level determination section determines the notification level in a plurality of stages;
    a lowest one of the plurality of stages of the notification level is a level in which the notification processor does not perform the notification process;
    as the notification level determined by the notification level determination section becomes higher, the notification processor performs the notification process in a notification mode that more strongly notifies the driver of the risk of the collision with the preceding vehicle; and
    the notification level determination section sets the notification level to be a lower level than an original notification level determined based on a present first risk index and a present second risk index when at least one of the first risk index or the second risk index is shifted to a value indicating a safer state under a condition that the notification processor performs the notification process.

2. The driving assistance device according to claim 1, further comprising:
    a driver state recognition section that determines whether the driver is in a predetermined abnormal state based on at least one of output data of a driver state sensor for outputting data indicating a state of the driver or a detection result of a steering angle sensor for detecting a steering amount by the driver, wherein:
    the notification level determination section determines the notification level to be a higher level when the driver state recognition section determines that the driver is in the abnormal state than a level when the driver state recognition section determines that the driver is not in the abnormal state.

3. The driving assistance device according to claim 1, further comprising:
    a driver state recognition section that determines whether the driver is in a predetermined abnormal state based on at least one of output data of a driver state sensor for outputting data indicating a state of the driver or a detection result of a steering angle sensor for detecting a steering amount by the driver, wherein:
    the notification level determination section determines the notification level using a predetermined default threshold preliminarily set with respect to the first risk index when the driver state recognition section determines that the driver is not in the abnormal state;
    the notification level determination section determines the notification level using a predetermined abnormal state threshold preliminarily set with respect to the first risk index when the driver state recognition section determines that the driver is in the abnormal state; and
    the notification level determined using the abnormal state threshold is set to be higher than the notification level determined using the default threshold.

4. The driving assistance device according to claim 1, further comprising:
    a driver state recognition section that determines whether the driver is in a predetermined abnormal state based on at least one of output data of a driver state sensor for outputting data indicating a state of the driver or a detection result of a steering angle sensor for detecting a steering amount by the driver, wherein:
    the notification level determination section determines the notification level using a predetermined default threshold preliminarily set with respect to the second risk index when the driver state recognition section determines that the driver is not in the abnormal state;
    the notification level determination section determines the notification level using a predetermined abnormal state threshold preliminarily set with respect to the second risk index when the driver state recognition section determines that the driver is in the abnormal state; and
    the notification level determined using the abnormal state threshold is set to be higher than the notification level determined using the default threshold.

5. The driving assistance device according to claim 1, further comprising:
a safe inter-vehicular distance calculator that calculates a safe inter-vehicular distance from the preceding vehicle corresponding to the traveling speed of the own vehicle, wherein:
the first risk index is an approach degree that is a value obtained by dividing the safe inter-vehicular distance calculated by the safe inter-vehicular distance calculator by the inter-vehicular distance acquired by the inter-vehicular distance acquisition section; and
the notification level determination section sets the notification level to be a higher level as the approach degree as the first risk index becomes larger.

6. The driving assistance device according to claim 1, wherein:
the first risk index is a secure allowance time that is a value obtained by subtracting a predetermined reaction delay time, a predetermined reaction time, and a predetermined necessary inter-vehicular distance time from an inter-vehicular distance time obtained by dividing the inter-vehicular distance by the traveling speed of the own vehicle; and
the notification level determination section sets the notification level to be a higher level as the secure allowance time as the first risk index becomes smaller.

7. The driving assistance device according to claim 1, wherein:
the second risk index is a time-to-collision that is a value obtained by dividing the inter-vehicular distance by the relative speed between the own vehicle and the preceding vehicle; and
the notification level determination section sets the notification level to be a higher level as the time-to-collision as the second risk index becomes smaller.

8. A driving assistance device that performs a notification process for notifying a driver of a risk of a collision with a preceding vehicle in cooperation with a predetermined notification device, the driving assistance device comprising:
a processor with a memory configured to:
successively acquire an inter-vehicular distance between the preceding vehicle and an own vehicle;
calculate a first risk index that is a parameter indicating a degree of the risk of the collision between the preceding vehicle and the own vehicle based on a traveling speed of the own vehicle and the inter-vehicular distance;
successively calculate a second risk index that is a parameter indicating the degree of the risk of the collision between the preceding vehicle and the own vehicle, the second risk index being different from the first risk index, based on a relative speed between the own vehicle and the preceding vehicle;
successively determine a notification level indicating a strength of notification for notifying the driver of the risk of the collision with the preceding vehicle, based on the first risk index and the second risk index; and
perform the notification process in a notification mode corresponding to the notification level, wherein:
the notification level is determined in a plurality of stages;
a lowest one of the plurality of stages of the notification level is a level in which the processor does not perform the notification process;
as the notification level becomes higher, the processor performs the notification process in a notification mode that more strongly notifies the driver of the risk of the collision with the preceding vehicle; and
the notification level is set to be a lower level than an original notification level determined based on a present first risk index and a present second risk index when at least one of the first risk index or the second risk index is shifted to a value indicating a safer state under a condition that the processor performs the notification process.

* * * * *